United States Patent [19]
Ho

[11] Patent Number: 6,064,384
[45] Date of Patent: *May 16, 2000

[54] COMPUTER USER INTERFACE SYSTEM AND METHOD HAVING BOOK IMAGE FEATURES

[75] Inventor: Seng Beng Ho, Unionville, Canada

[73] Assignee: E-Brook Systems PTE Ltd, Singapore, Singapore

[*] Notice: This patent issued on a continued prosecution application filed under 37 CFR 1.53(d), and is subject to the twenty year patent term provisions of 35 U.S.C. 154(a)(2).

[21] Appl. No.: 08/703,404

[22] Filed: Aug. 26, 1996

[51] Int. Cl.⁷ ....................................................... G06F 3/14
[52] U.S. Cl. ........................................... 345/350; 345/901
[58] Field of Search ..................................... 345/350, 351, 345/349, 348, 339, 901; 707/501, 512, 530

[56] References Cited

U.S. PATENT DOCUMENTS

| | | | |
|---|---|---|---|
| 5,237,651 | 8/1993 | Randall | 345/350 |
| 5,283,864 | 2/1994 | Knowlton | 345/350 |
| 5,333,255 | 7/1994 | Damouth | 345/350 |
| 5,392,387 | 2/1995 | Fitzpatrick et al. | 345/350 |
| 5,417,575 | 5/1995 | McTaggart | 434/317 |
| 5,438,662 | 8/1995 | Randall | 345/350 |
| 5,463,725 | 10/1995 | Henckel et al. | 345/350 |
| 5,467,102 | 11/1995 | Kuno et al. | 345/1 |
| 5,592,605 | 1/1997 | Asuma et al. | 345/348 |
| 5,632,022 | 5/1997 | Warren et al. | 345/350 |
| 5,668,964 | 9/1997 | Helsel et al. | 345/350 |
| 5,673,406 | 9/1997 | Hirayama | 345/350 |
| 5,870,092 | 2/1999 | Bedford-Roberts | 345/350 |
| 5,900,876 | 5/1999 | Yagita et al. | 345/350 |
| 5,909,207 | 6/1999 | Ho | 345/156 |

FOREIGN PATENT DOCUMENTS

| | | |
|---|---|---|
| 0 246 971 | 11/1987 | European Pat. Off. . |
| 0 635 780 | 1/1995 | European Pat. Off. . |
| WO 91/11769 | 8/1991 | WIPO . |
| WO 92/08182 | 5/1992 | WIPO . |

OTHER PUBLICATIONS

FSR Integration Guide and Evaluation Parts Catalog with Suggested Electrical Interfaces, Interlink Electronics, pp. 1 and 25.

*Primary Examiner*—Matthew M. Kim
*Assistant Examiner*—Crescelle N. dela Torre
*Attorney, Agent, or Firm*—Oblon, Spivak, McClelland, Maier & Neustadt, P.C.

[57] ABSTRACT

A computer user interface system and method arranges a set of information hosted on a computer into a set of books, where each book includes a subset of the set of information, labels each book with a respective portion of the subset of the set of information, and selects a book from the set of books. Selecting the book from the set of books includes steps of displaying the respective portions of the books as a book document image that includes pages which correspond to the respective portions of the books, generating a command for moving through the pages, displaying an animated image of the pages of the book document being at least one of flipped, scrolled, slid and flashed images, and selecting the book when a selected one of the pages containing a selection portion of the book is earlier displayed.

27 Claims, 18 Drawing Sheets

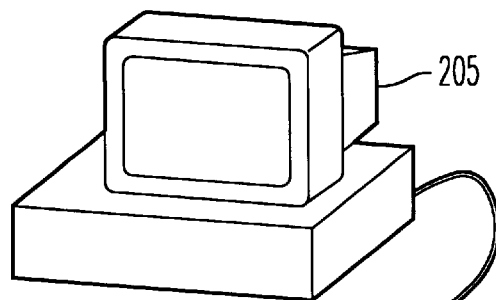
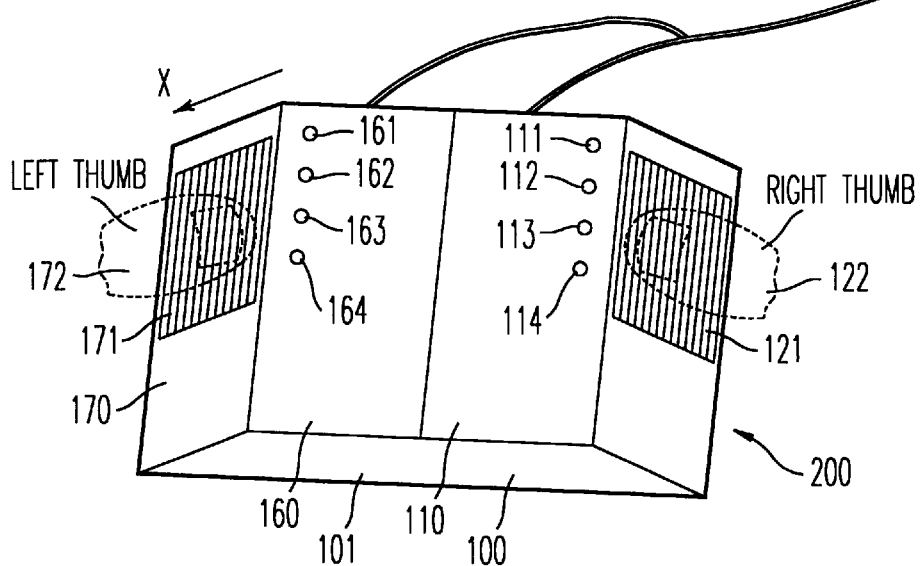
*FIG.2A-1*
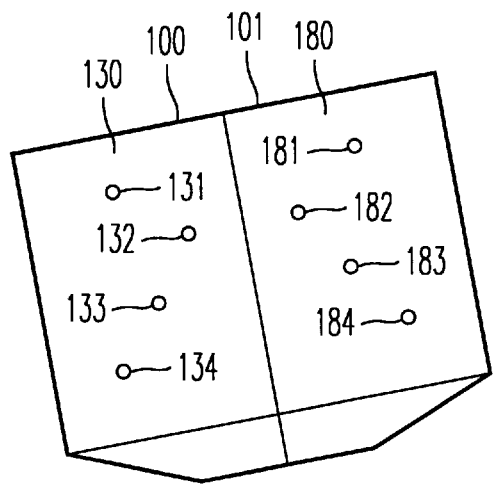
*FIG.2A-2*

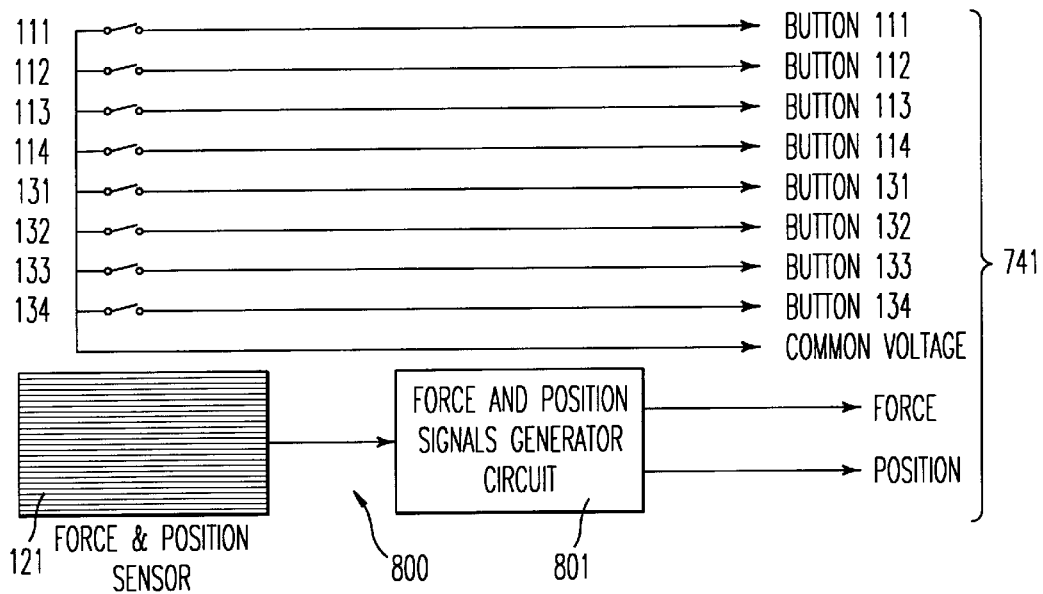
FIG. 8
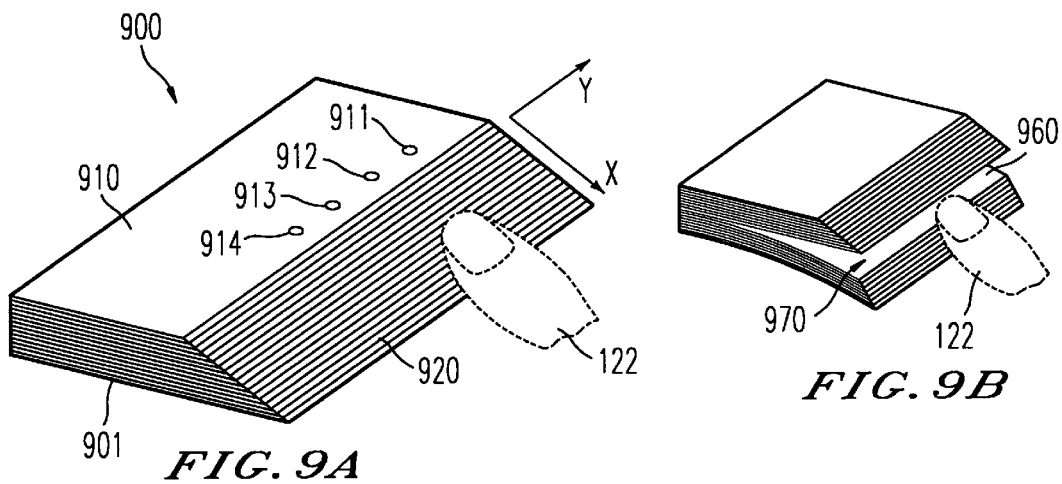
FIG. 9A
FIG. 9B
FIG. 9C

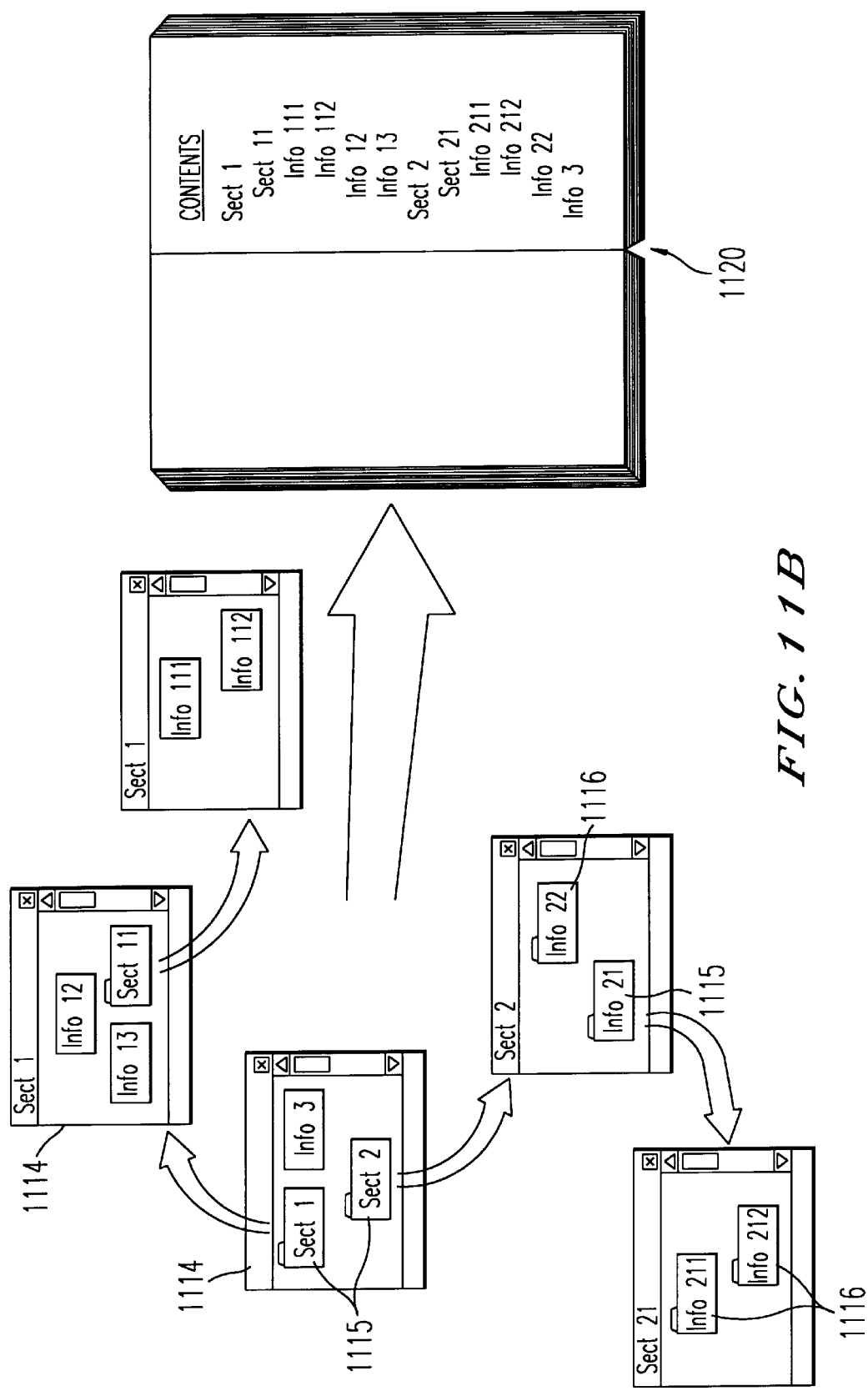

COMPUTER USER INTERFACE SYSTEM AND METHOD HAVING BOOK IMAGE FEATURES

This application is related to copending patent application, Ser. No. 08/703,407, filed herewith, now U.S. Pat. No. 5,909,207 and copending patent application, now abandoned Ser. No. 08/311,454, filed Sep. 26, 1994, both of which are incorporated herein by reference.

BACKGROUND OF THE INVENTION

1. Field of the Invention

The present invention relates to a computer user interface system and method for the purpose of browsing through documents stored in a computer. Specifically, the present invention facilitates the browsing of a document stored in a computer in such a way that it allows a rapid view of what contents are present and the organization of the material in the document, as well as rapid access to the items in the document involved.

2. Description of the Prior Art

Currently, the method for viewing documents stored in a computer is through a computer monitor screen. For documents that are longer/larger than can be contained within one screen, a means is provided to scroll the document up and down or to jump to a particular point in the document (through the use of, for example, a "mouse" coupled with scroll bars at the edges of the document displayed on the screen or through the use of hypertext links).

However, most people do not find this a particularly convenient way to view a document, as compared with a book. That this is true is evidenced in the fact that despite the fact that the computer has been in increasing use, there is not only no corresponding reduction in paper use, but an increase in paper quantity is required to print what is conveniently stored in a computer that can be seemingly easily and flexibly manipulated for viewing. Sometimes the printed version of the information involved is necessary, like in the case of printing a picture on a sheet of paper to be pasted on some surface (e.g., a wall), or in the case of the convenience of having a relatively light, hardy paperback book for reading in almost any possible situation and location, but there are times when a reader is quite happy to sit at a desk in front of a desktop computer or handle a notebook computer away from the desk, and yet the reader would still prefer a printed version of the document in a hand-held format. This is especially true in the case of looking through manuals, including software manuals, to understand how to operate a device or software application. The irony is that computer software packages usually come with thick and heavy manuals containing information which can easily be stored on a light-weight CD-ROM, and even if the manuals are sometimes dispensed in the form of a CD-ROM, more often than not people would print them out into a hard-copy format in order to facilitate reading.

What is involved when one interacts with the printed material in a book is a subtle and complicated process. To start with, material in a book is presented in a sequential order, with a continuity of material from page to page, and there is also a hierarchical structure in the material presented (as the material is organized into chapters, sections, subsections, etc.) because ideas in the material are related to each other in some kind of conceptual hierarchy. The human perceptual system inputs data in a sequential manner, and after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for something of interest to him/her; or (c) one is interested in reading only portions of the book (in the case of, say, reading the manual to understand how to operate something). In these cases, one browses through the subject book to find the material of unique interest to that reader.

Two basic things are achieved in the browsing process. First, the browser has a glimpse of what are the contents of the book document. Second, the browser has an idea of approximately where the items of interest are so that the browser can (a) return to look for them later when needed, and (b) have an understanding of the relationships between the material currently being viewed and other material (i.e., an understanding of the hierarchical structure involved). When browsing a book document, many finger-operations are required of the browser in order to flip through the pages and, together with the inherent sequential order imposed by the pages, very quickly allow the browser to have an understanding of the nature, location and organization of the material involved.

In the process of browsing through a book, one can perform the following operations:

(a) flip through the pages at varying speeds depending on the level of detail at which one wishes to view the material in the book;

(b) jump to the approximate location of the item of interest;

(c) change the direction of flipping (forward or backward) very rapidly because
   (i) one would like to compare and contrast material on different pages,
   (ii) after jumping to an approximate location of some items of interest one would like to find their exact locations, or
   (iii) one is unsure of where the item of interest is and is in the process of searching for it; and (d) mark the locations of some pages of interest that one may want to later return.

All these operations are performed very rapidly with the fingers interacting with the flipping pages and with minimal unnecessary movements of the fingers and hands. Interestingly, a book/magazine with soft and flexible pages is harder to handle because more finger and hand movements are needed to browse through it, while books with stiff pages can be browsed with almost no movement of the hand.

In currently available methods of browsing through documents stored in a computer, e.g., the use of a mouse combined with scroll bars and buttons on the computer screen, more movements of the hands are necessary to effect the various operations described above. Also, fine control of the hand or fingers (depending on whether the mouse uses hand movement to move the cursor on the screen or finger movement like in the case of a track ball) is necessary to position the cursor on the screen at the required places. The process is both lengthy and clumsy. The lengthiness of the process taxes the human short term memory's ability to remember items encountered in the recent past for the purpose of establishing the relationships between items and the clumsiness of the process creates distraction and interferes with the short term memory process, a well known effect in perceptual psychology.

Because material in a book is organized into pages, it also enhances the ability of the reader to better remember the location of various portions of the material involved. Also, unlike the process of scrolling through a document on a screen like what is normally done in a word-processor, wherein the contents become a blur and reading is impossible, when one moves through the material in a book through flipping, one is still able to read at least the approximate contents, if not the details. It is due to these features that a person browsing through a book can acquire a good understanding of its contents, the location of specific items and organization of the material.

It is because of the reasons set forth above, people still prefer to read a book in their hands, rather than a document image displayed on a computer screen using currently available methods.

U.S. Pat. No. 5,467,102 (Kuno et al.) discloses a device for document viewing that consists of two display screens. One of the purposes of using two display screens is to allow the user to display two different pages from the document so that they can be read side-by-side (e.g., a diagram and its textual explanation). Another purpose is to allow a large picture to be displayed simultaneously on both pages. The Kuno et al. device allows users to change the speed of movement through the document through a pressure sensor—the more pressure applied, the faster the pages in the document are moved through. The Kuno et al. device also allows the document to be viewed in the forward or backward direction by pressing on a forward sensor area or a reverse sensor area respectively. One can also select a page to jump to by pressing on an icon displayed on the screen. However the Kuno et al. device still does not provide the same convenience as browsing through a book, primarily because when switching between the operations for different controls—the speed of movement through the document, the change of direction of viewing, and the jumping to different parts of the document—there are a lot more hand and finger movements than is the case in manipulating a physical book. Moreover, the Kuno et al. device is a specialized, relatively costly device with sensors and hardware built onto two display screens, whereas the present inventor recognizes that a lower cost and more practical device would be one that adds modularly to the existing computer system.

Currently, there are also computer mice that can eliminate the above-mentioned problem of positioning cursor on the computer screen with a conventional mouse (i.e., fine control of the hand or fingers is needed). These mice allow the user to specify "hot locations" on the screen on which the cursor "homes onto" with less fine control than conventional mice. Furthermore, a subset of these mice can generate "vertical only" or "horizontal only" movement of the cursor so that the scrolling process requires less fine control of the muscle than is required with a conventional mouse. These mice eliminate some, but not all, of the problems associated with the conventional methods of computer input as far as computer-based document browsing is concerned.

In U.S. Pat. No. 5,417,575 (1995) McTaggart discloses an electronic book that comprises laminated sheets bound together in the form of a book. On each of these sheets, printed material is arranged on the top layer and below that layer is an electronic backdrop containing thin light-emitting diodes (LED's) and pressure sensitive switches affixed onto a backing sheet. The LED's generate visual signals that can be seen through the top layer for the purpose of highlighting parts of the printed material. The pressure switches, positioned under certain items in the printed material, are for the purpose of sensing the user's selection of those items. A speaker is also provided on the book to generate audio signals for explaining the text or giving the user audio feedback. Contact or photo-sensitive switches are also embedded in the pages to allow the electronic circuits to know which pages are currently being viewed, so that the appropriate audio and visual signals can be generated. Even though this apparatus is in a form that allows a person to handle it like handling a typical book, with visual and audio enhancements of the printed material as well as facilities that accept the user's feedback, it is basically a hard-wired device that is not reprogrammable and different hardware has to be configured for books with different contents. No provision is available for downloading document files from a computer for display on the electronic book nor is the electronic book able to display any arbitrary document file. This device is hence not suitable for browsing through documents stored in a computer.

Therefore, the inventor has identified there exists a need for a low-cost, modular device that can be connected to existing computer systems and that permits easy, effective computer-based document browsing that approaches that of browsing through a book.

SUMMARY OF THE INVENTION

In view of the aforementioned short-comings of presently available schemes for browsing through documents stored in a computer, one objective of the present invention is to provide a browsing device that exploits the use of finger operations normally involved in browsing through a book, namely, the change of speed of movement through the document involved, the change of direction of movement through the document, the jumping to other portions of the document, and the bookmarking of pages (e.g., when a page is bookmarked, it can be returned/jumped to later very quickly by using the controls operated by the fingers).

Another objective of the invention is that the positioning and design of the controls for the above-mentioned operations performed by the fingers are such that they allow almost no movement of the hand and minimal movements of the fingers, thus maximizing the ease of browsing through the stored document. The dexterity of the human fingers is to be fully exploited for these controls.

A further objective of the invention is to provide a low cost, modular browsing device that can be easily attached to existing computer systems much like how a mouse attaches to a computer system.

Still a further objective is to provide a reconfigurable construct for the browsing device so that it can be (a) configured into a hand-held controller; (b) attached to the sides of existing computer screens; (c) configured to cooperate with a mouse so that there is no need to move the user's hand(s) when switching between browser-related operations and mouse-related operations; and (d) configured to cooperate with a gyro-mouse so that the entire assembly can be used in the absence of a table top. The method is chosen by the user depending on his/her preference.

Another objective of the invention is to provide a means to display, on the computer screen, the document to be browsed through using the browsing device. The display is in the form of a computer book together with showing the thicknesses of material in the document before and after the currently viewed material, showing of the bookmarks, and showing, on the thicknesses, of the location of the pages that would be jumped to at any given time if jumping were to be effected.

Another objective of the invention is to provide the following five methods of organizing the material in the document and corresponding display formats: (a) organized into pages and can be flipped through page by page from right to left or vice versa, much like what happens when one flips through a book; (b) organized into pages and can be flipped through page by page from bottom to top or vice versa, much like what happens when one flips through a notepad; (c) organized into pages and slid through page by page from right to left or vice versa, much like what happens when one views a microfilm; (d) organized into pages that can be flashed one after another; (e) organized so to be scrolled through, with no distinct page boundaries, much like what is normally done in a word-processor. The first three methods incur more cost in terms of storage space and processing time, but when used together with the aforementioned browsing device result in a browsing process that most resembles that of browsing through a book, a notepad, or a micro-film. The last two methods demand less storage space and reduced processing time, and even though these two methods do not precisely emulate the book-browsing process, they can still benefit from the rapidity of finger control effected on the browsing device.

Another objective of the invention is to provide simultaneous multiple indexing in conjunction with the inventive browsing system. When a keyword of interest is encountered during the reading of the document, the user selects it using a cursor on the screen in conjunction with a pointing device such as a mouse, like what is normally done in current computer systems, or using his/her finger in conjunction with a touch or pressure sensing screen, or other methods. In response, the pages on which explanations or other issues related to this keyword reside are bookmarked by the inventive system, after which the user can quickly flip to one of these pages using the mechanisms provided in the browsing system.

Another objective of the invention is to use the above-mentioned browsing facility in conjunction with other software that can reorganize the material in the document involved to facilitate browsing/viewing—for example, the positioning of material for comparison side by side on the pages currently being viewed.

Another objective of the invention is to use the above-mentioned browsing facility in conjunction with software that can highlight selected portions of the material or annotate on the pages in the document involved to facilitate browsing/viewing/reading.

Yet another objective of the invention is to provide the above-mentioned browsing facility to a word processor to facilitate the entering, processing, and viewing/browsing of material in a word processor.

Another objective of the invention is to provide the above-mentioned browsing facility to any software in which information cannot be fitted within one computer screen for viewing or manipulating.

Yet another objective of the invention is to provide a new metaphor—the "library metaphor"—to the computer operating system's human interface in which information on the computer screen which is traditionally presented in the form of windows can now be presented in the form of "books".

The above-mentioned objects can also be achieved by providing a browsing device for browsing through document that includes, a top surface, a sensor surface and a bottom surface. A sensor area on the sensor surface detects the position of a finger along one direction and the force of the finger on the sensor area. The browsing device also includes four buttons/on-off switches on the bottom surface, and four additional buttons/on-off switches on the said top surface, each of which is operated by the fingers. An electrical circuit converts the force and position of the finger on the sensor area as detected by the force and position sensors on that area into electrical forms and outputs them. The electrical circuit also outputs the on/off states of the four buttons/on-off switches on the bottom surface, and four additional buttons/on-off switches on the said top surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a top/bottom perspective view of the browsing device configured into a mini-book configuration used in conjunction with a computer.

FIG. 8 is a schematic electrical block diagram of the browsing device of FIG. 1B.

FIG. 9 is a schematic perspective view of another embodiment of the browsing device that uses many thin, hard, and flexible pieces of material bound together in the manner of the binding of the pages of a book.

FIG. 11B is a comparative schematic diagram of directories/sub-directories and the files in a "windows" system compared with chapters and sections in a computer book that uses the flipping method of FIG. 5A to move through the book.

DESCRIPTION OF THE PREFERRED EMBODIMENTS

Figure 1A:
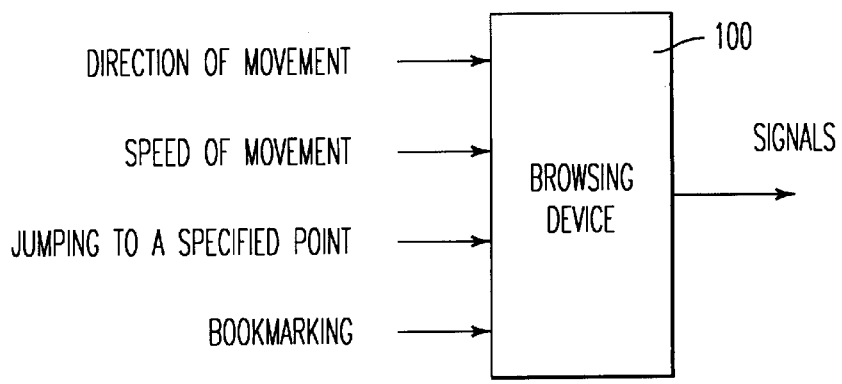
FIG. 1A is the block diagram of the browsing device according to the present invention, detailing input commands and output signals.

Referring now to the drawings, wherein like reference numerals designate identical or corresponding parts throughout the several views, and more particularly to FIG. 1A thereof which depicts the browsing device 100 according to the present invention that can be used in conjunction with existing computer systems for the purpose of browsing through documents or any information stored in the computer. Four commands are input and detected by the browsing device 100. These commands include the following: (a) specifying whether a movement in a forward direction or in a backward direction through the document is to be performed; (b) specifying a speed of the movement described in (a); (c) jumping to a specified location in the document or information involved; and (d) specifying that certain portions of the document or the information involved is to be bookmarked. Based on these commands, signals are generated and output to effect the necessary operations in a computer system (e.g., computer 205 in FIG. 2A) attached to the browsing device 100.

Figures 1, 1B:
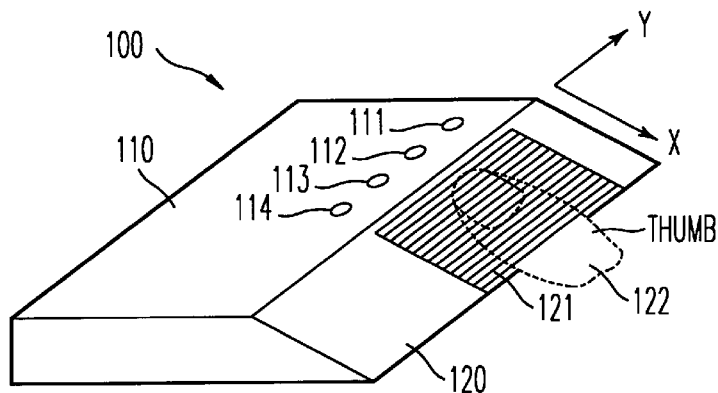
FIG. 1B is a schematic perspective view of a first embodiment of the browsing device.

FIG. 1B depicts one-embodiment of the primary browsing device 100 according to the present invention. The browsing device 100 consists of a slanted surface 120, extending from a top surface 110 of the browsing device 100. The slanted surface 120 supports a user's thumb 122 on which to rest, although the user may use another instrument or finger as well. During operation, four other fingers 141–144 are placed on a bottom surface 130 of the device, opposed to the thumb 122. On the slanted surface 120 a set of force and position sensors disposed in a sensor area 121 (sensors such as an appropriately customized version of Interlink electronics Thin-film Linear Potentiometer Part Number 360) detect (a) a force of the thumb 122 on the slanted surface 120 within the sensor area 121 and (b) the position of the thumb 122 (or one of the other fingers) in the sensor area 121 in the direction of the slant. Henceforth the direction of the slant is referred to as an x-direction, as shown in FIG. 1B, where the positive x-direction points away from the edge that adjoins the top surface 110 and the slanted surface 120. The position of the thumb 122 (or one of the other fingers) in the y-direction (a direction perpendicular to the x-direction on the slanted surface 120) gauges whether the thumb 122 remains on the sensor area 121.

Four buttons/switches 131–134 are placed on the bottom surface 130, within easy reach of the four fingers (141–144) during those operations when these fingers (141–144) are placed on the bottom surface 130. On the top surface 110 of the device 100, another four buttons/switches (111–114) are placed, preferably parallel to the edge adjoining the top surface 110 and the slanted surface 120, as shown in FIG. 1B.

The force of the thumb 122 (or one of the other fingers) on the sensor area 121 dictates how fast to move through the document, and the position of the thumb 122 (or one of the other fingers) along the x-direction dictates the point to which the document is jumped. More particularly, the buttons (131–134, and 111–114) on the bottom and top surfaces (130 and 110 respectively) are for the purposes of bookmarking. The use of these buttons (131–134, 111–114) depends on the particular configuration in which the browsing device 100 is used and will be described below.

Figures 1, 1B, 2:
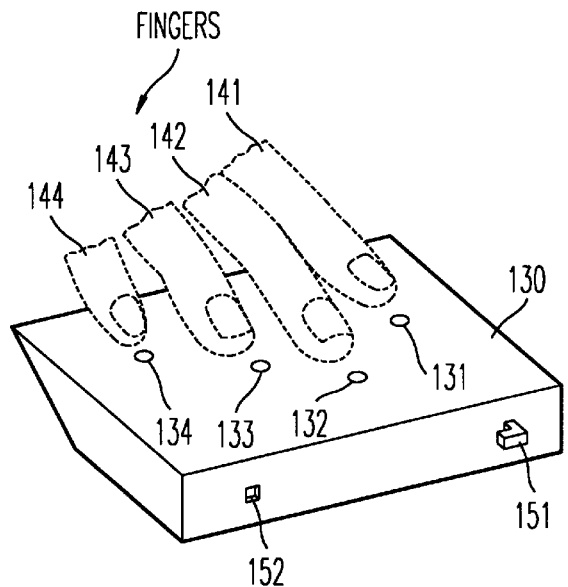

FIGS. 2A–2F depict alternative configurations to employ the browsing device 100 for producing the browsing input. The browsing device 100 depicted in FIG. 1B is preferably used with an operator's right hand. A left-hand version of the browsing device 101 as depicted in FIG. 2A is employed in some of the embodiments depicted in FIGS. 2A–2F.

FIG. 2A depicts one embodiment of the mini-book configuration 200 in which a left-hand version 101 and a right-hand version 100 of the browsing device 100 are joined back-to-back through latching mechanisms 151 and 152 as shown in FIG. 1B and the resulting assembly 200 is electrically operatively connected to the computer 205 (such as an IBM Aptiva A92, Part Number 42H0333). In operation, the left and the right hands operate the devices on the left and right respectively, hence the left thumb 172 and right thumb 122 rest on the left and right sensor areas (171 and 121) respectively. The other four fingers of both hands are placed near the buttons (131–134, 181–184) on the bottom surfaces 130 and 180 of both the left and right devices. In this configuration, the buttons (111–114, 161–164) on top surfaces 110, 160 are available for auxiliary functions.

In this configuration, the direction of movement (i.e., forward or backward) through the document (using flipping or other methods, all to be described in detail later) is effected through the force applied by the right and left thumbs (122 and 172) on the sensor areas 121 and 171 respectively. The right thumb 122 force activates a forward movement through the document and the left thumb 172 force activates a backward movement. The speed of movement is preferably proportional to the force applied, although other force/speed relationships may be employed successfully. The right thumb 122 operating the right sensor area 121 activates jumping to points in the document involved that lie between the currently viewed material in the document and the end of the document and the left thumb 171 operating the left sensor area 172 activates jumping to points in the document involved that lie between the currently viewed material in the document and the beginning of the document. The right fingers other than the thumb 122 operating the buttons 131–134 on the bottom surface 130 create bookmarks for points in the document involved that lie between the currently viewed material in the document and the end of the document and the left fingers other than the thumb 172 operating the corresponding buttons 181–184 on the corresponding bottom surface 180 create bookmarks for points in the document involved that lie between the currently viewed material in the document and the beginning of the document.

An x-direction is defined along the slanted surface for the left-hand device 101 that is perpendicular to the edge adjoining the top surface 160 and the slanted surface 170 of the left-hand device 101 and the positive x-direction is taken to be the direction away from that edge as illustrated in FIG. 2A. The operations to be described below for the sensor areas 121 or 171 and for the buttons on the bottom surfaces 131–134 or 181–184 are similar for both the right-hand device 100 and the left-hand device 101 and unless necessary, only the operations for the right-hand device 100 will be described.

The position of the thumb 122 in the x-direction on the sensor area 121 (refer to FIG. 1B) as detected by the position sensors on the slanted surface 120 determines the page in the document to jump to (for the cases in which the material in the document is organized into pages to be flipped, slid or flashed on the computer screen, the details of which will be described later) or the point in the document to jump to (for the case in which material in the document is not organized into pages like in the case of the use of scrolling to move through the document). Let x=0 (the origin) be the point at which the slanted surface 120 meets the top surface 110. The thumb 122 will be referred to as being "at" position x1 when it covers the point x1 and some contiguous points to the "right" of x1, i.e., some of the contiguous points x such that x>x1, and "right" refers to the conventional positive axial direction. This is because the intersection of the thumb 122 and the slanted surface 120 (in the sensor area 121) on the browsing device 100 has a small spatial extent and hence it will have some dimension in the x-direction.

Figure 3:
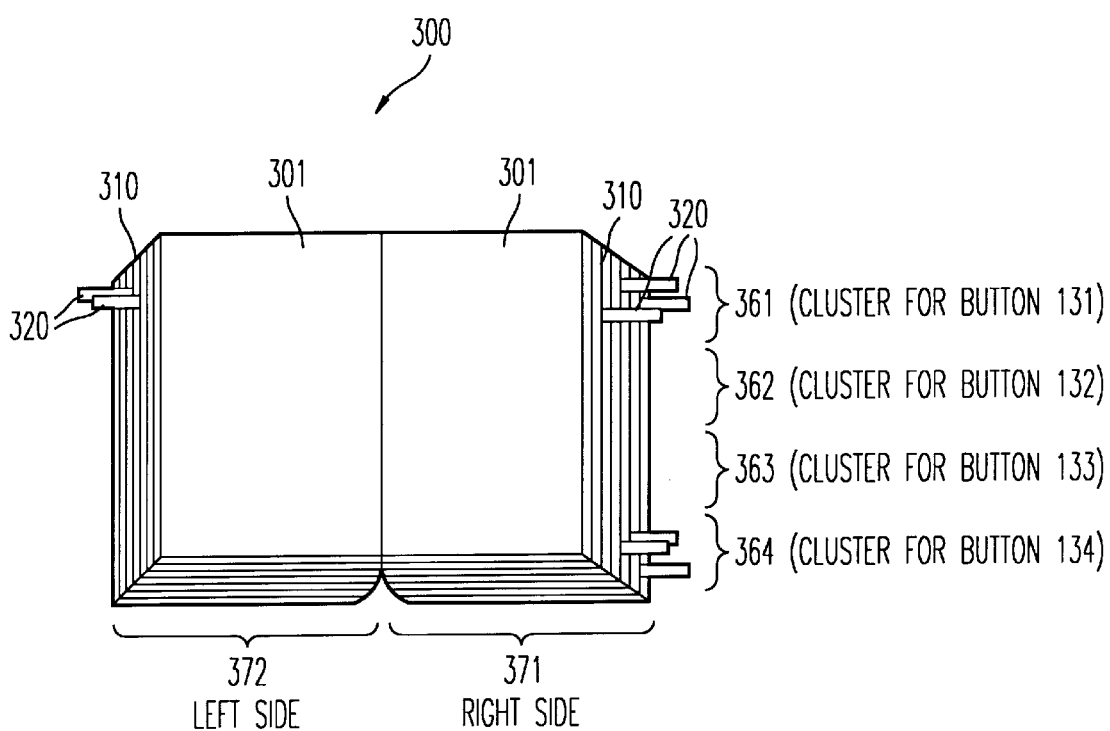
FIG. 3 is a top perspective view of a computer book displayed on a screen that is to be browsed through using browsing device of the present invention.

FIG. 3. shows the "book" 300 displayed on the computer screen, henceforth referred to as the computer book. When using the current embodiment of the browsing device 100, in order to allow the user to have an idea of the thickness of the computer book 300 on both sides, so that the user can have a good idea of the approximate location of the currently viewed pages in the document involved, the thickness 310 of the computer book 300 on both sides is shown on the computer screen next to the displayed pages 301 as shown in FIG. 3.

In the browsing of a real book, the thumb selects the page to jump to by sliding along the side until it reaches that page. In the process of accomplishing this, the thumb slides along the side of the book in a direction perpendicular to the edge of the book the thumb is touching (similar to the x-direction in FIG. 1B) by an amount proportional to how far along in the document the page to be jump to is from the current page. Because in the browsing device 100 depicted in FIG. 1B, the width of the slanted surface felt by the thumb does not change, even as the amount of material/number of pages present on that "side" of the "book" changes, the translation of the x-position of the thumb to a page in the document to jump to is slightly more complicated.

Consider initially no force is applied onto the sensor area 121 by the thumb 122 and a certain page of the document involved is being displayed. When the thumb 122 is placed at any position x=XT1 on the sensor area 121 and when a force is applied for a time longer than a user-specified pre-defined, short period, preferably, but not limited to, a range of 100 milliseconds to 1 second, the document is moved through forward (or backward if the left sensor area 171 is activated by the thumb 172). The speed of movement is proportional to the force applied. If the force is applied only momentarily, (e.g., less than preferred 100 millisecond) no movement through the document takes place, but a starting position for any subsequent jumping process is taken to be XT1. When the thumb 122 is moved from x=XT1 to a position XT2 (XT2>XT1) and the thumb 122 is pressed momentarily, a jump is made to a page in the document that is further along. Let XS be the width of the sensor area 121 and let PR be the number of pages remaining from the current page to the end of the document (or to the beginning of the document, if the left device 101 is activated). PJ, the number of pages to skip over is equal to PR * (XT2−XT1)/(XS−XT1). That is, at any given time, the distance along the slanted surface from the current thumb position XT1 to the edge, XS, is treated as being proportional to the number of pages remaining from that point to the end or beginning of the document. In the case of using the method of scrolling to display the document in which the material is not organized into pages, then PR becomes the amount of material, say the number of lines of material, remaining and PJ becomes the amount of material to be skipped over.

After the thumb 122 moves from the starting position XT1 in the positive x-direction, before it applies any force to effect a jump, it is at liberty to move between XT1 and XS in the positive or negative x-directions to search for a page it wishes to jump to. If in this process the thumb 122 moves in the negative x-direction beyond the starting position XT1, whatever new position the thumb 122 finds itself in and after having applied a momentary force in that position, that position will become a new starting position XT1 for the computation of any subsequent jump. If the thumb 122 did not apply any momentary force after having moved in the negative x-direction beyond the starting position XT1, and then it moves back past XT1 in the positive x-direction, the starting position for any subsequent jump will be XT1.

When one continues to apply force for longer than the user-defined pre-defined, short time period on the sensor area 121 using the thumb 122 after a jump is made while holding the thumb 122 at the same position, the movement through the document begins from that page/point onwards, and the speed of movement is proportional to the force applied as before.

The starting position of the thumb 122 for the jumping process can be at x=0 or any position XT1 in the x-direction. But starting at x=0 allows the use of a larger width (from x=0 to XS) to correspond to the remaining material and thus a better resolution of control in terms of jumping/skipping. At any given time, no matter how much remaining material there is, while one is moving through the document by having the thumb 122 at a given position, one can always move the thumb 122 back to a position of smaller x (that does NOT trigger a movement through the document in the opposite direction—one has to use the other device operated by the other hand to change direction) or x=0, and apply some force momentarily to signify that the user has now repositioned the thumb 122. The user may then continue the process of moving through the document by applying the force longer than a pre-defined, short moment, or use this current position as a new reference/starting point (XT1) and slide the thumb 122 to a new position (XT2) to skip through some material. The movement of the thumb 122 back to a smaller x or x=0 to define a starting position XT1 before the jumping process gives the user a better resolution for the jumping/skipping control.

Figure 4:
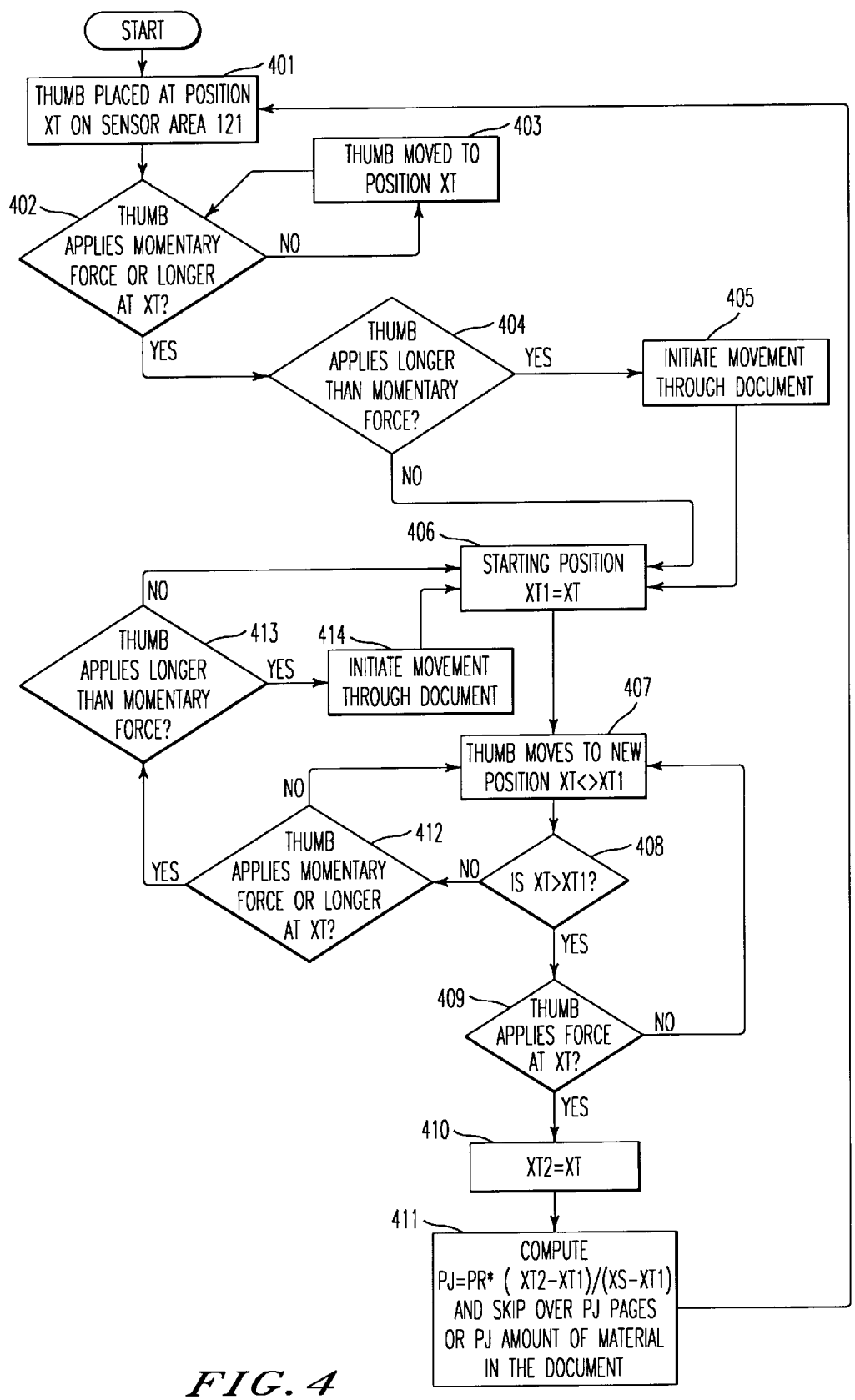
FIG. 4 is a flowchart that details the mechanisms for jumping to other parts of the document being viewed/browsed through and movement through a document under the control of the thumb on the browsing device of present invention.

The mechanisms for jumping to some other parts of the document and movement through the document under the control of the thumb 122 as described above are described in the flowchart in FIG. 4.

Consider initially a certain page of the document is being displayed. In step 401, the thumb 122 is placed at position XT on the sensor area 121. The process flows to step 402, where a check is made if a force has been applied momentarily or longer (than a predefined, short time). If not, nothing happens; the thumb 122 may move to a new position XT (step 403) or stay in the same position XT. If an affirmative response is received in step 402, a check is made to see if the thumb has applied the force longer than momentarily. If so, the process flows to step 405 where movement through the document is initiated (with a speed proportional to the force applied and a direction depending on whether the left-hand device 101 or the right-hand device 100 in the mini-book configuration 200 is activated). If a negative response is received in step 404, the process flows to step 406. Similarly, after initiation of movement through the document in step 405, the process also flows to step 406. In step 406, the starting position XT1 is assigned the value of the current thumb 122 position XT. The process then flows to step 407 where the thumb 122 either stays in the current position or moves to a new position XT (<>XT1). The process then flows to step 408, where a check is made to find out whether XT is greater than XT1. If so, a check is made in step 409 to find out whether a force is applied at XT; if not, nothing happens and the thumb may move to a new position XT (<>XT1) in step 407. If the response to step 409 is affirmative, the process flows to step 410, where XT2 is assigned the value of the current XT. The process then flows to step 411 where a value PJ=PR* (XT2−XT1)/(XS−XT1) is computed. (PR is the number of pages or amount of material remaining from the current page to the end of the document if the right-hand device 100 in the mini-book configuration 200 is now being activated or from the current page to the beginning of the document if the left-hand device 110 in the mini-book configuration 200 is being activated. XS is the width of the sensor area 121.) A jump is effected that skips over PJ pages or PJ amount of material in the document. The process then flows back to step 401 where the process repeats.

If in step 408, XT is found to be smaller than XT1, then the process flows to step 412 which checks if a force has been applied at XT momentarily or longer. If not, nothing happens, the process flows to step 407 where the thumb can move to a new position XT. If so, step 413 checks to see if the force applied is longer than a pre-defined, short period. If the force applied is longer than a pre-defined, short period, the process flows to step 414 where movement through the document is initiated (with a speed proportional to the force applied and a direction depending on whether the left-hand device 101 or the right-hand device 100 in the mini-book configuration 200 is activated). If a negative response is received in step 413, the process flows to step 406 where the starting position XT1 is assigned the current value of XT. After the initiation of movement through the document in step 414, the process also flows to step 406.

The above described method of jumping/skipping through the pages through the use of the sliding of the thumb 122 over a certain distance (in the x-direction) is referred to as the relative distance method whereas the jumping/skipping in the process of browsing through a physical book uses absolute distance (in the direction perpendicular to the edge of the book). Another embodiment of the browsing device 1000 that uses absolute distance will be described later in reference to FIG. 10.

To provide the user with feedback of his/her thumb movement on the sensor area 121 along the x-direction (FIG. 1B) before he/she effects the jump to a different part of the document involved, an indication of the position of the thumb 122 is provided on the thickness 310 area of the book 300 displayed on the screen next to the pages 301 currently being viewed (FIG. 3). Recall that the thumb 122 starts from one point on the sensor area 121 and slides on the sensor area 121 in the x-direction before a force is applied to effect the jump. In this process, the thumb 122 slides over many points on the x-position sensor 121 on the slanted surface 120. An indication is made on the computer screen of the location of the page that would be jumped to had the thumb 122 applied a force at any given point along the x-direction. As the thumb 122 slides on the sensor area 121 before the application of the force, the whole width of the thickness 310 displayed on the screen next to the currently viewed pages 301 is preferably divided into two parts. One part corresponds to all the pages that will be skipped if a force were applied at that point in the x-direction on the sensor area 121. The other part corresponds to the pages that remain from the page jumped to if a force were applied to the end of the document (if one is moving forward through the document and the right hand device 100 in the mini-book configuration 200 is being activated) or to the beginning of the document (if one is moving backward through the document and the left-hand device 101 in the mini-book configuration 200 is being activated). There are two ways to display the boundary (a thin line) between these two parts that corresponds to the point or page in the document jumped to if a jump were to take place. Preferably within the thickness area 310 on the computer screen is shown by the boundary, a thin line, as being different in darkness, texture, or color (preferably darkness) from the rest of the thickness 310—hence one would see a line oriented perpendicular to the x-direction (parallel to the y-direction, FIG. 1B). and whose length is confined to the thickness 310 region moving in the positive or negative x-direction depending on the direction of movement of the thumb 122 on the sensor area 121. Alternatively, one part, say the left part, is shown as being different in darkness, texture or color (preferably darkness) from the other part, say the right part—hence one would see one part expanding and the other contracting, or vice versa, depending on the direction of movement of the thumb 122 on the sensor area 121.

The use of the four buttons 131 to 134 on the bottom surface 130 of the browsing device 100 will be described for bookmarking. During operation, each of the other four fingers 141 to 144 except the thumb 122 is placed near each of the four buttons 131 to 134 and each of these buttons is meant to be operated by the finger nearest to it. At any moment when one is viewing a page of the document and decides that it might be of interest to return to later, one presses one of the buttons 131 to 134 momentarily and then lets go, either once or twice, depending on whether one wishes to create a finger-bookmark or a permanent-bookmark respectively as will be described below. The page will then be bookmarked and a bookmark 320 is displayed on the screen as shown in FIG. 3—sticking out from the position of the page/point that it marks on the side of the book 300. One can use the same button (one of the buttons 131 to 134) to bookmark more than one point/page. All the bookmarks 320 that are created by the same button (i.e., one of buttons 131 to 134) are clustered together (e.g., one of clusters 361 to 364) and displayed as such as shown in FIG. 3.

After one has bookmarked a certain page/point on a certain side (right, 371, or left, 372, FIG. 3) of the book, if one moves through the document past that page/point (forward or backward respectively), the bookmark will either disappear or be transferred to the other side, depending on whether the bookmark is a finger-bookmark or a permanent-bookmark respectively. The finger-bookmarks are more like the bookmarks created by the use of the fingers when browsing through a physical book—they are more temporary and they "disappear" after the bookmarked page/point has been passed. In the case of a page/point marked by a permanent-bookmark, when the page/point is passed the bookmark will be transferred to the other side and be grouped in the cluster that corresponds to the same cluster in the other side from which it originates. (The preferred method by which this transfer is to be effected and shown on the computer screen depends on the method of movement through the document which will be described later together with the description of those methods). To remove a permanent-bookmark, one presses the corresponding button twice in quick succession (e.g., "double click") when the bookmarked page/point is currently in view. (The permanent bookmarks are more like the bookmarks created by inserting, say, a slip of paper when one is browsing through a physical book.) The finger-bookmarks and the permanent-bookmarks are displayed differently on the computer screen. (They are differentiated either by shape, size, color, marking, or lettering.)

For the finger-bookmark, if one wishes that the bookmark not be removed after one has moved through the document past the corresponding page/point, one can transfer it to the other side by creating another bookmark using the fingers on the other hand, much like what one does when browsing through a physical book. The permanent-bookmarking process tends to create many bookmarks and they should be used only if necessary.

To return to a bookmarked page/point (whether it be finger-bookmarked or permanent-bookmarked), one presses the button (one of 131–134 or one of 181–184) that corresponds to the cluster to which the page/point belongs and uses the corresponding thumb 122 or 172 to apply force to the corresponding sensor area 121 or 171 while continuing to press the button. If there is more than one bookmarked page in each cluster, the page that is nearest the current page will be jumped to. (Note that this can obliterate some finger-bookmarks in the other clusters if in this process the document is moved through past those corresponding pages.) After having jumped to a bookmarked page, if one wishes to take some time to read that page, one has to stop applying force using the thumb 122 or 172 on the corresponding sensor area 121 or 171 or else the process of moving through the document will begin. One should also stop pressing the corresponding button (one of 131–134 or one of 181–184). (This is to relieve the finger of unnecessary tension). If this page was a finger-bookmarked page and one wishes to bookmark this page again, one has to press the button (one of 131–134 or one of 181–184) again (once or twice depending on whether now one wishes to finger-bookmark or permanent-bookmark it respectively).

To avoid confusion and speed up the browsing process, even though the facility of using one button to bookmark more than one page is provided, hence creating the cluster of bookmarks associated with that button, it is to be avoided if possible. Hence, one should try to use as many of the buttons (131–134 and 181–184) provided as possible. That is, if there are four pages to be bookmarked on one side, one should use all four buttons (131–134 or 181–184, depending on whether it is the right side 371 or left side 372 respectively that is involved), creating only one bookmark in each cluster. This way, a speedier jump to a desired bookmarked page is possible because one does not have to jump through those unwanted pages bookmarked in the same cluster before one arrives at the intended page.

At any given time, only one of the hands is supposed to perform operations (i.e., only one of the two browsing devices 100 and 101 is supposed to be activated). If both hands try to perform operations at exactly the same time, there will be no operation performed. If one hand performs an operation before the other hand, then that hand takes priority. One exception to this is when the device is used in conjunction with a flipping method 500 or 540 of moving through the document involved to be described in detail later (with reference to FIG. 5A and FIG. 5E), whereby the operation of both hands is used to create a "fan display" 600 or 610 (with reference to FIG. 6A and FIG. 6B).

Figure 2B:
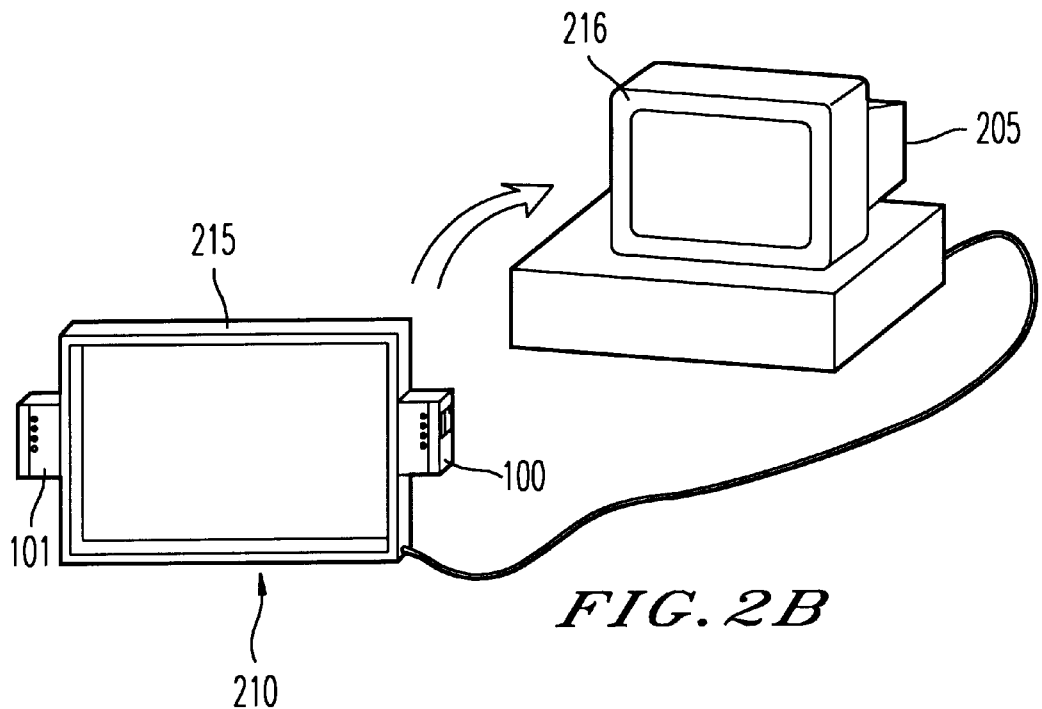
FIG. 2B is front perspective view of the browsing device configured into a screen configuration used in conjunction with a computer.

FIG. 2B depicts one embodiment of the screen configuration 210. In this configuration 210, the operations are identical to that described above for the mini-book configuration 200 depicted in FIG. 2A, except now, in this configuration 210, the two browsing devices 100 and 101 are separated and attached to the sides of a screen 216(such as an IBM Color Monitor G50, Part Number 96G1593). This is achieved by first attaching these devices to a frame 215, and then attaching the frame 215 to the screen 216. This is done because the browsing devices 100 and 101 need to be firmly attached and we would like to use existing computer screens 216 and hardware with no necessity of any physical modifications to them.

Figure 2C:
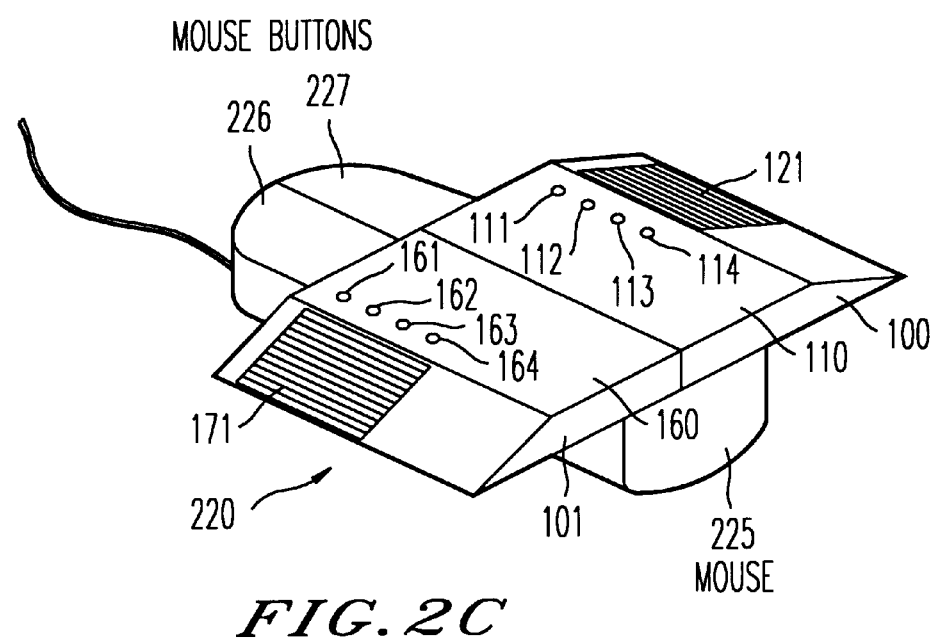
FIG. 2C is a front perspective view of the browsing device configured into a mouse configuration used in conjunction with a computer.

FIG. 2C depicts one embodiment of the mouse configuration 220. In this configuration 220, two browsing devices 100 and 101 are joined together in the same manner as in FIG. 2A and also mounted onto a mouse 225 (e.g., a mouse adapted from the IBM Enhanced Mouse II, Part Number 13H6714). This allows the use of one hand for operating the browsing devices 100 and 101 as well as the mouse 225. The operation of the browsing devices 100 and 101 is largely the same as that described for the mini-book configuration 200 except for the following observations. The mouse-browser configuration 220 is preferably placed on a flat surface like the top of a table, but not typically held in the hands. The four buttons 131–134 on the bottom surface 130 (FIG. 2A) of the right-hand device 100 are now not primarily used, but instead the four buttons 111–114 on the top surface 110 replace the functions of the four bottom buttons 131–134. Similarly, for the left-hand device 101, the four buttons 161–164 on the top surface 160 replace the functions of the four buttons 181–184 on the bottom surface 180 (FIG. 2A). The eight top buttons 111–114 and 161–164 are now operated only by the index finger which also operates the mouse buttons 226 and 227. For the operation of the left sensor area 172, the thumb of the same hand is preferably used. For the operation of the right sensor area 121, one of the other three fingers, normally the middle finger, is used. (For a left-handed, "southpaw", this is reversed).

Figure 2D:
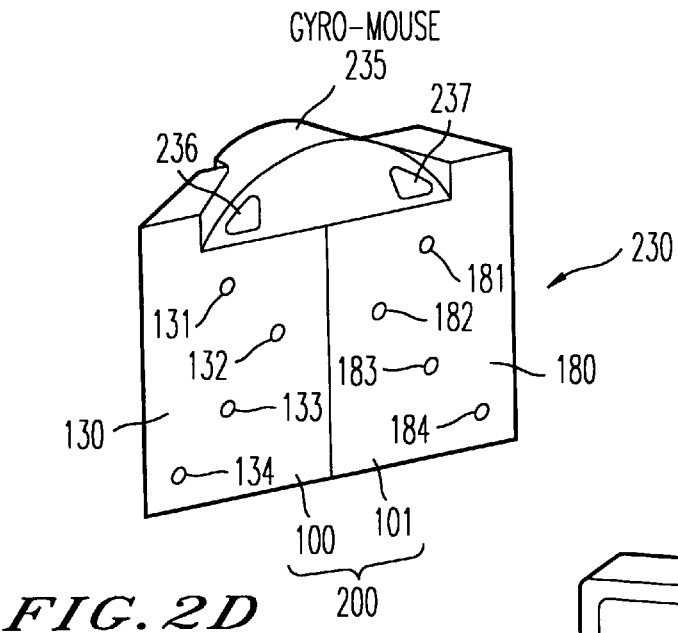
FIG. 2D is a front perspective view of the browsing device configured into a gyro-mouse configuration used in conjunction with a computer.

FIG. 2D depicts one embodiment of the gyro-mouse configuration 230 (which includes an adapted gyro-mouse such as a GyroPoimt® Desk from Gyration, Inc. of Saratoga, Calif., Part Number PA00038-001). Currently, there is a type of mouse called the-gyro-mouse that can be held in the hand and used away from the table top. This gyro-mouse 235 can be attached to the mini-book configuration 200 of FIG. 2A which consists of a right-hand browsing device 100 and a left-hand browsing device 101, and the whole assembly—the gyromouse configuration 230—can be used in the hand away from the table top. Because in the mini-book configuration 200, both hands are used and the bottom buttons 131–134 and 181–184 are operated by all the fingers except the thumbs, the gyro-mouse 230 must be attached to the mini-book configuration 200 in such a way that the index fingers can also be used to operate the gyro-mouse buttons 236 and 237, as shown in FIG. 2D. The gyro-mouse buttons 236 and 237 must be near enough to the buttons 131 and 181 operated by the index fingers so that the index fingers can reach them (buttons 236 and 237) easily. While preferably a specially made gyro-mouse 235 will be constructed to join with the mini-book configuration 200 as shown in FIG. 2D. the mini-book 200, screen 210, and mouse 220 configurations of the browsing devices 100 and 101 preferably add modularly to existing computer hardware.

Figure 2E:
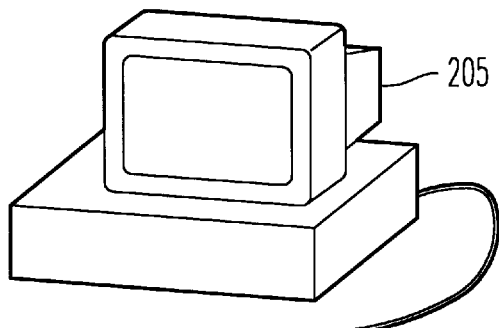
FIG. 2E is a front perspective view of the browsing device configured into a one-hand configuration used in conjunction with a computer.

FIG. 2E depicts the one-hand configuration 240 of the browsing device. In this configuration, only one browsing device 100 is used, freeing one hand to do something else. During operation, the device 100 is held in one hand in much the same way as that in the mini-book configuration 200—the thumb is placed on the sensor area 121 while the other fingers operate the buttons 131–134 on the bottom surface 130. The operation is largely the same as that for the mini-book configuration 200 except now the browsing device 100 functions as the left device 101 as well as the right device 100 in the mini-book configuration 200. A triple click of the button 131 (ref er to FIG. 1B—the button nearest the index finger) toggles between these two states. This configuration 240 may not handle as well as the mini-book configuration 200 but it frees one hand for other operations. (Instead of triple-clicking an existing buttom such as button 131, an alternative is to add another buttom to the existing buttons and allow a single click of that button to effect the same operation.)

Figure 2F:
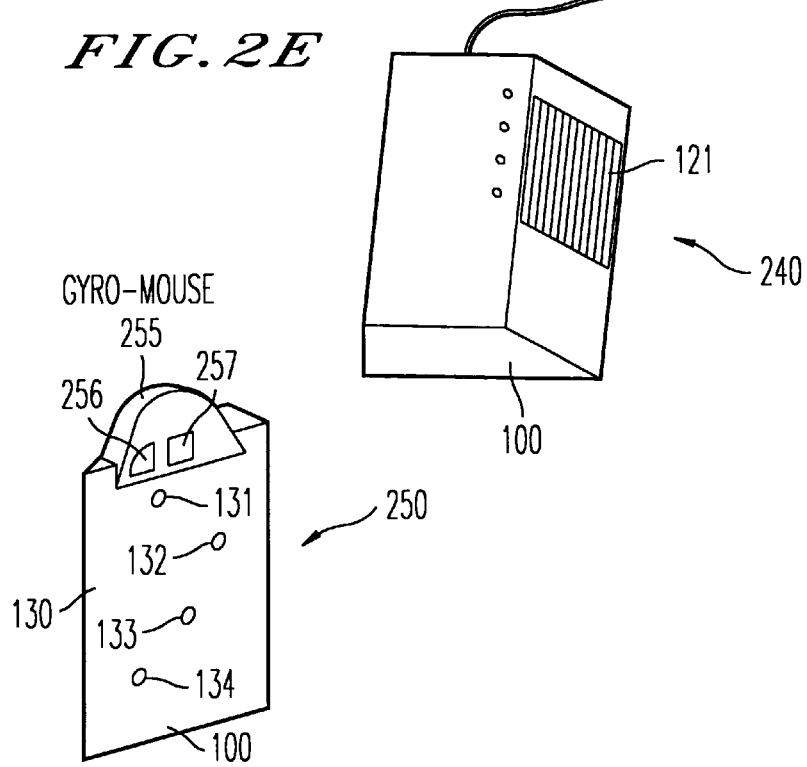
FIG. 2F is a front perspective view of the browsing device configured into a one-hand-gyro-mouse configuration used in conjunction with a computer.

FIG. 2F depicts the one-hand-gyro-mouse configuration 250 of the browsing device. In this configuration, a gyro-mouse 255 is attached to one browsing device 100. The operation is largely the same as in the one-hand configuration 240 in FIG. 2E except now the one index finger also operates the mouse buttons 256 and 257. Again, like in the case of the gyro-mouse configuration 230 depicted in FIG. 2D, in this configuration the buttons 256 and 257 of the gyro-mouse 255 must be positioned near the button 131 on the bottom surface 130 of the browsing device 100 that is nearest the index finger during normal operations of the device 100 so that the index finger can operate all three buttons 256, 257 and 131 easily. If no such gyro-mouse 255 exists, then a specially made one has to be used.

The browsing device 100 employed in the configurations 200, 210, 220, 230, 240, and 250, among others, can be used in conjunction with a number of different methods for displaying the movement through the document involved on the computer screen in a computer book. Among others, there are five methods which will be described here.

Figure 5A:
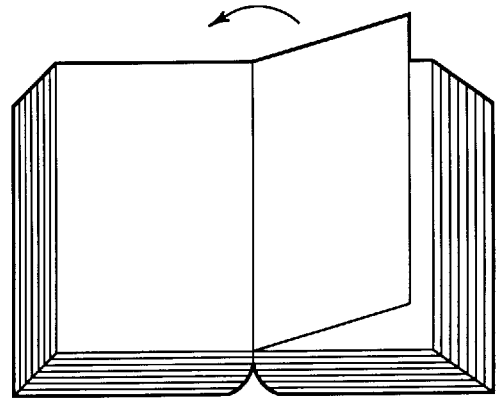
FIG. 5A is an top perspective view of the computer book of the present invention that uses a flipping method of moving through a document.

FIG. 5A depicts one preferred embodiment of the flipping method 500. In this method, the material in the document is organized into pages and as one moves through the document, the pages are shown to flip across from right to left or vice versa, depending on the direction of movement, much like what happens when one flips through a physical book. In this method, when a permanent-bookmark is being transferred from one side to the other, it will be shown to be attached to the page, sticking out from the page, and flipped together with the page. Also, to be consonant with the flipping of successive pages, in the process of jumping to a different page in the document, the pages skipped are shown to flip across together as a thick page (the thickness being proportional to the number of pages involved) like in the case of a physical book. The display of the thicknesses of the material in the document on both sides of the displayed pages, the use and display of bookmarks (finger-bookmarks or permanent-bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

Using commercially available computer hardware and software, one method of generating flipping pages from a document stored in semiconductor, magnetic, optical, or other media on a personal (e.g. laptop) computer in the form of a text file, such as a text file in the Windows 95 operating system involves several steps. First, the contents of the text file is displayed on the computer screen (such as an IBM Color Monitor G50, part Number 96G1593) using, say a word processing software such as MicrosofT® Word Version 7.0 from Microsoft Corporation, Part Number 62306 running on the computer. The image on the computer screen which is stored in the screen dump can then be put into the clipboard using the "Print Screen" key on the keyboard (such as an IBM Keyboard, Part Number 06H9742). The clipboard can be imported as an image file into a graphics software such as Visioneer PaperPort™ from Visioneer Communications, Inc. of Palo Alto, Calif., Part Number C1132-90000 running on the computer using the "Paste" command provided by the software, and then exported and stored as an image file in, say, the TIFF format. Each page in the document can be captured in this way in one TIFF file. Then, using a video editing/movie making software such as Adobe Premier™ 4.0 from Adobe Systems Incorporated of Mountain View, Calif., part Number 02970103 running on the computer, the TIFF files, each containing one page of the document, can be imported into the software and using the Motion command and superimposition facilities provided by the software a "movie" of flipping pages can be generated and if necessary, exported and stored in a motion picture format such as a .AVI file.

For the purpose of the present invention, the various components/operations described above for generating flipping pages from an existing document file using currently available software are preferably integrated into a single software process that may be conveniently ported from one computer to the next and which requires minimal human intervention. An alternative method reads from the existing document file directly, generates the necessary images for all the pages, and then creates a "motion picture" of flipping pages from these images. To move through the document forward or backward at any selected speed, mechanisms similar to forwarding or reversing at any selected speed when viewing a motion picture file (such as one in the .AVI format) using a software video player (such as Video for Windows from Microsoft Corporation) are used. The other features such as the thicknesses 310 (FIG. 3), the bookmarks 320 (FIG. 3) and the operations of bookmarking etc. are also incorporated.

While it is preferred to use off-the-shelf hardware and software to effect the flipping/flashing/scrolling/etc. effect, customized hardware and software can be used to perform an equivalent function.

Figure 6A:
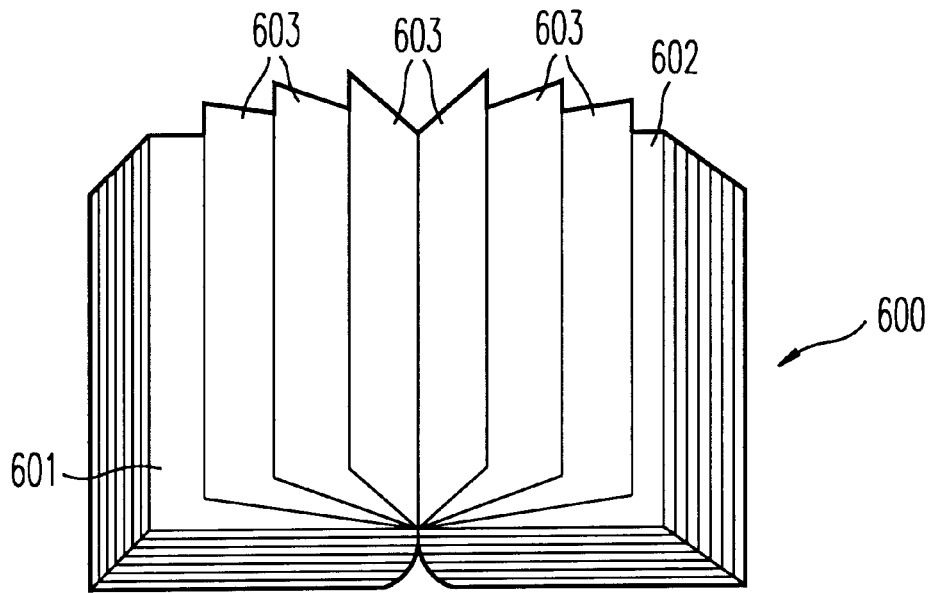
FIG. 6A is a top perspective view of an open fan display for displaying pages and that is used in conjunction with the flipping method of moving through the document illustrated in FIG. 5A.
Figure 6B:
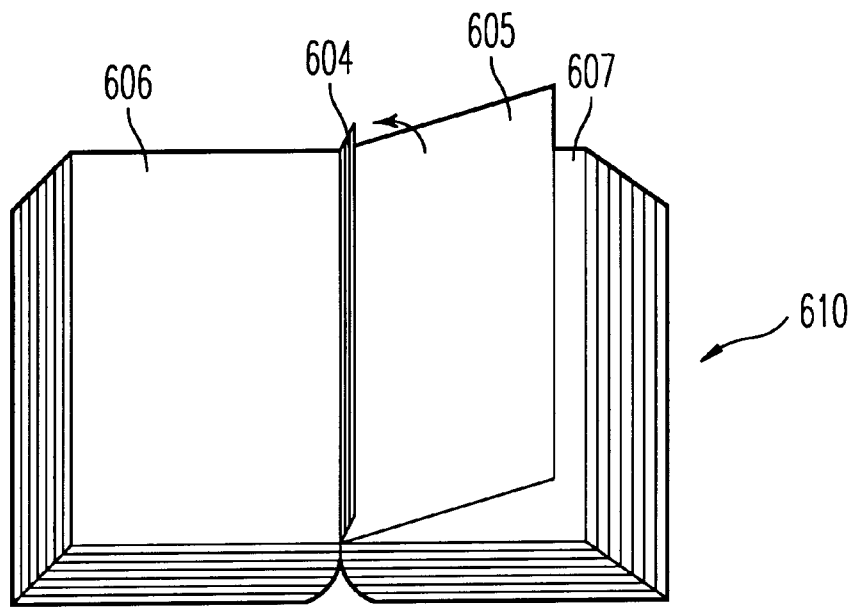
FIG. 6B is a top perspective view of a collapsed fan display for displaying pages and that is used in conjunction with the flipping method of moving through the document illustrated in FIG. 5A.

FIG. 6A depicts one embodiment of a open fan display 600 and FIG. 6B depicts one embodiment of a collapsed fan display 610 that can be created in conjunction with the flipping method 500. In the process of effecting the flipping of the pages using one thumb (say, the right thumb 122, which operates the sensor area 121 in the configuration 200, say), one can stop the pages from being completely flipped to the other side by the use of the other thumb (say, the left thumb 172) by applying a force on its associated sensor area (171 in the configuration 200, say) after the page has begun flipping. This force will be referred to as the opposing force. The force applied by the other thumb (in this case, the right thumb 122) will be referred to as the flipping force.

There are two kinds of fan display that can be created—the open fan display 600 or the collapsed fan display 610—depending on the magnitude of the opposing force. If the opposing force is of a magnitude roughly the same as or smaller than the flipping force, the pages 603 that have been flipped since the beginning of the process (i.e., since the opposing force has been applied) form equal angles between themselves as well as the two "flat" pages 601 and 602 on the left and right sides of the book as depicted in FIG. 6A. This creates the open fan display 600. If the opposing force is greater than the other force, a collapsed fan display 610 is created as shown in FIG. 6B. In this display 610, all the pages 605 that have been flipped since the beginning of the process (i.e., since the opposing force has been applied) are collected in a thick page 604 that forms an equal angle with the two "flat" pages 606 and 607 on the left and right sides of the book as depicted in FIG. 6B.

The open fan display 600 or the collapsed fan display 610 can also be created in conjunction with the process of jumping to another page. Earlier it was described that in order to be consonant with the flipping of successive pages, in the process of jumping to a different page in the document, the pages skipped are shown to flip across together as a thick page (the thickness being proportional to the number of pages involved) like in the case of a physical book. This thick, flipping page will be treated like any of those flipping pages 603 in the process of creating the open fan display 600 or the flipping pages 605 in the process of creating the collapsed fan display 610. Hence after a jumping process has been initiated and after the skipped pages have begun flipping across together as a thick page, if one were to now apply an opposing force, the process of creating a open fan display 600 or a collapsed fan display 610 will begin as described above.

If the thumb that initiated the flipping now stops applying force—i.e., the flipping force—to the sensor area (121 or 171 in the configuration 200, say), the pages will freeze in the open fan display 600 or the collapsed fan display 610, depending on which type of display is being created. For the collapsed fan display 610, at the moment when the flipping force stops, there could be one page 605 that is still in the process of being flipped as depicted in FIG. 6B. This page will immediately collapse onto the center, thick page 604 that has collected in it all those pages flipped earlier.

The open fan display 600 facilitates the viewing of many pages simultaneously, even though only the rough contents of each page can be properly viewed. The collapsed fan display 610 facilitates the viewing and comparison of the two flat pages 606 and 607 that are currently in view since all the flipped pages 605 have been collected in the center, thick page 604 that does not block the view of the two flat pages 606 and 607.

If now the thumb that applied the opposing force—the thumb that prevented the complete flipping of the pages—removes its force, and then that is followed by the normal initiation of the flipping action by either thumb, the fanned out pages 603 (in the case of the open fan display 600) or the center thick page 604 (in the case of the collapsed fan display 610) will collapse and flip over to the appropriate side and normal flipping begins.

Figure 5B:
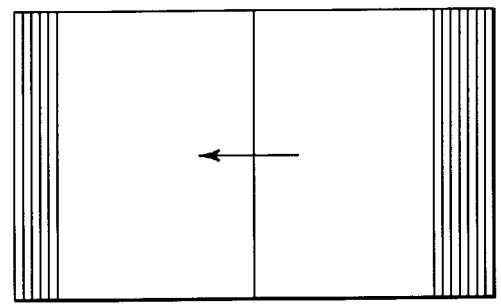
FIG. 5B is a top view of the computer book of the present invention that uses a sliding method of moving through a document.

FIG. 5B depicts one embodiment of the sliding method 510. In this method 510, the material in the document is organized into pages and the pages are shown to slide across the screen, much like what happens when one views a microfilm. However, unlike the case of the conventional microfilm viewer, more than one page can be displayed here, depending on the choice of the user. In this method 510, when moving through the document, the pages are seen to move horizontally within a fixed frame—as a page slides leftward, as it appears on the right side of the frame, its left side appears first and as it reaches the left side of the frame, the left side of the page would disappear first and vice versa for rightward movement. FIG. 5B shows two pages being displayed at the same time but in this method 510 any number of pages can be displayed at the same time, depending on the user's preference and the selection made.

In the sliding method 510, when a permanent-bookmark is being transferred from one side to the other, it will be shown to disappear from the side from which it originates and appear on the other side when the page involved reaches the other side. To be consonant with the sliding of successive pages, in the process of jumping to some other parts of the document, the page(s) jumped to is shown to slide into view much like what happens when one operates a physical microfilm. The display of the thicknesses of the material in the document on both sides of the displayed pages, the use and display of bookmarks (finger-bookmarks or permanent-bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

To generate sliding pages, a method similar to that described for the flipping pages for FIG. 5A can be used.

Figure 5C:
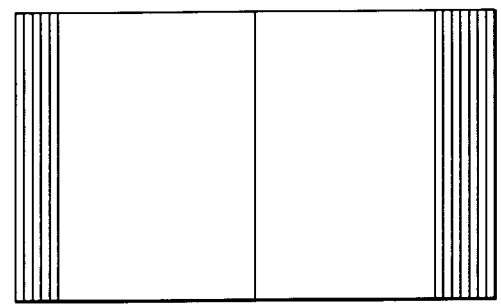
FIG. 5C is a top view of the computer book of the present invention that uses a flashing method of moving through a document.

FIG. 5C depicts the flashing method 520, where the material in the document is organized into pages and one or more than one page at a time (as specified by the user) is flashed onto the screen as one moves through the document—that is, the current page(s) disappears and the next page(s) before or after the current page(s) appears. FIG. 5C depicts, in particular, the case in which two pages are displayed at a time. When more than one page is displayed on the screen and flashing is effected, it can be effected in two modes—the exclusive mode or the overlapping mode. Consider the case of displaying two pages at one time on the screen as shown in FIG. 5C. In the exclusive mode, the next two pages that appear are the two pages that follow the righthand page of the previously displayed pages. In the overlapping mode, the next two pages that appear are the righthand page from the previously displayed pages and the page that follows that page. Similarly, when more than two pages are displayed at any given time, the exclusive mode dictates that the next pages displayed will not be the same as the currently displayed pages and the overlapping mode dictates that the next pages displayed can have some but not all of the pages that are the same as the currently displayed pages. Hence the overlap refers to the same pages that are displayed in the current display as well as the very next display of the pages. For more than two pages, the user can specify the amount of overlap for the overlapping mode.

In the flashing method 520, when a permanent bookmark is being transferred from one side to the other, it will be shown to disappear from the side from which it originates and appear on the other side when the page involved reaches the other side. The display of the thicknesses of the material in the document on both sides of the displayed pages, the use and display of bookmarks (finger bookmarks or permanent bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

To generate sliding pages, a method similar to that described for the flipping pages for FIG. 5A can be used.

Figure 5D:
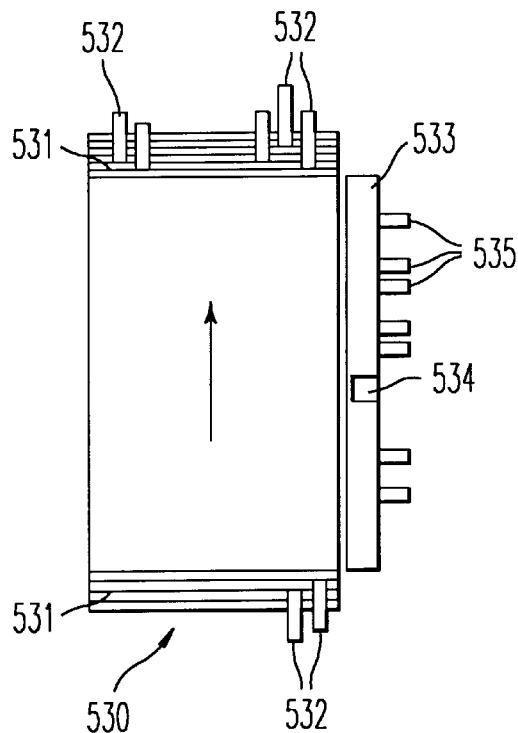
FIG. 5D is a top view of the computer book of the present invention that uses a scrolling method of moving through a document.

FIG. 5D depicts the scrolling method 530. Even though scrolling usually results in a blur, this method can still benefit from the ease of control using the browsing device 100. In this method 530, the material in the document is not organized into distinct pages. Instead, lines of text or portions of graphics disappear from the top of the display and appear at the bottom of the display or vice versa as the document is moved through forward or backward respectively. The thicknesses 531 of material present before or after the currently viewed material are shown on the top and bottom of the display as shown in FIG. 5D. The bookmarks 532 (finger-bookmarks or permanent bookmarks) can likewise be displayed on these thicknesses 531. The operations of bookmarking and the display of the location, on the thicknesses 531, of the page/point in the document that would be jumped to were jumping to be effected at any given moment based on the thumb's x-position on the sensor area 121 at that moment are like what is described above for the computer book 300 in FIG. 3.

To generate scrolling pages, a method similar to what is used in MicrosofT® Word Version 7.0, Part Number 62306 can be used, with appropriate enhancements for the display of the thicknesses 310 (FIG. 3), the bookmarks 320 (FIG. 3) and the operations of bookmarking, etc.

If the mini-book configuration 200, say, is used in conjunction with the scrolling method 530 of moving through the document, the user can rotate the mini-book configuration 200 held in his/her hand which is normally used "horizontally"—with the left-hand device 101 held to the left and the right-hand device 100 held to the right (FIG. 2A)—by, say, 90 degrees clockwise, so that the left-handed device 101 is now on the top and the right-handed device 100 is now on the bottom (to achieve this, the left and right wrists will have to bend a fair bit). The controls will now be more natural because they correspond better to what is seen on the screen—i.e., the left-hand/top device 101 and the right-hand/bottom device 100 will now operate the bookmarks on the top and bottom respectively of the material shown on the screen in the scrolling method 530.

In the scrolling method 530, depending on the user's preference, a scroll bar 533 and a marker 534 on it, similar to what is normally used in a word processor, can be added to one side, say the right side, of the displayed material, as shown in FIG. 5D, to indicate the position of the currently viewed material in the document involved, but the marker 534 here is not used in conjunction with the browsing device 100 for effecting the scrolling of the document. (In current word processors, normally the marker 534 is used in conjunction with the mouse for effecting the scrolling of the document.) Alternatively, bookmarks 535 are added to the scroll bar 533 to indicate the pages bookmarked. However, the display of the bookmarks 532 on the top and bottom of the currently viewed material is still necessary because their positions along the top and bottom edges give an indication of the fingers and buttons on the browsing devices 100 and/or 101 (depending on whether one or two devices are being used) that are to be used to jump to the pages that they mark. In this method 530, when a bookmark is inserted, it is associated with the material that is currently in view. For permanent-bookmarks, they disappear from one side (top or bottom) of the display and appear on the other side (bottom or top respectively) when the associated material has gone completely out of view.

In the flashing method 520 and scrolling method 530, in the process of jumping to some other parts of the document, the page(s) or parts of the document jumped to are flashed onto the screen, much like what happens when one uses the scroll bar in conjunction with the mouse to jump to some other parts of the document in a typical word processor.

Figure 5E:
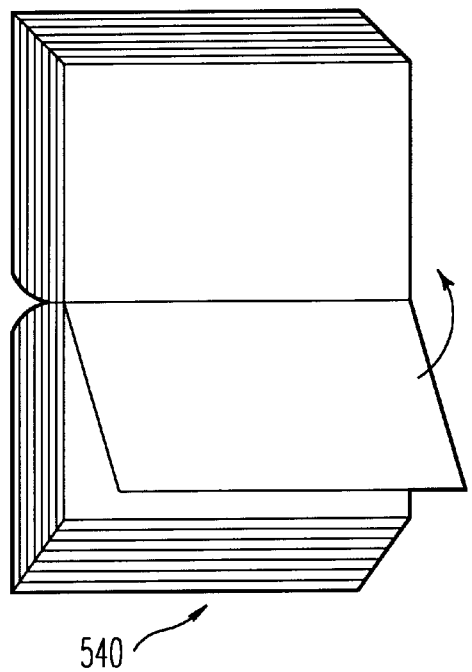
FIG. 5E is a top perspective view of the computer book of the present invention that uses a vertical flipping method of moving through a document.

FIG. 5E depicts the vertical flipping method 540 of the browsing device. This method is similar to the flipping method 500 depicted in FIG. 5A, and except for the flipping action that is effected vertically instead of horizontally, all other operations are the same as that described for the flipping method 500, including the vertical equivalents of the open and collapsed fan displays depicted in FIGS. 6A and 6B. Similar to the case described above for the scrolling method 530, if the mini-book configuration 200, say, is used in conjunction with the vertical flipping method 540 of moving through the document, the user can rotate the mini-book configuration 200 held in his/her hand which is normally used "horizontally"—with the left-hand device 101 held to the left and the right-hand device 100 held to the right (FIG. 2A)—by, say, 90 degrees clockwise, so that the left-handed device 101 is now on the top and the right-handed device 100 is now on the bottom (to achieve this, the left and right wrists will have to bend a fair bit). The controls will now be more natural because they correspond better to what is seen on the screen—i.e., the left-hand/top device 101 and the right-hand/bottom device 100 will now operate the bookmarks on the top and bottom respectively of the material shown on the screen in the vertical flipping method 540.

The simultaneous multiple indexing facility is now described. In the process of viewing a document, if there is a keyword or phrase that is of interest to the user, one can select it using one of the usual methods—the mouse cum cursor method, the finger cum pressure-sensing computer display screen method, etc.—and then all those pages that contain the explanations or related topics of the selected item will become permanently-bookmarked—i.e., all the corresponding bookmarks 320 will appear on the displayed computer book 300 like that described above (FIG. 3). on the bookmarks 320, markings, letters or otherwise, will appear to indicate the kind of information these pages contain about the selected item (e.g., basic definition, detailed elaboration, related concepts, etc.). The name of the selected item will also appear on the corresponding bookmark 320 (in case more than one item has been selected). The user can then quickly jump to these pages. This facility allows the user to bypass the need of having to move through the document first to an index (usually at the end of the document) to locate the various references to the item of interest and then jump to those corresponding pages. Many returns to the index would also have to be carried out if there is more than one reference to the item involved.

Figure 7:
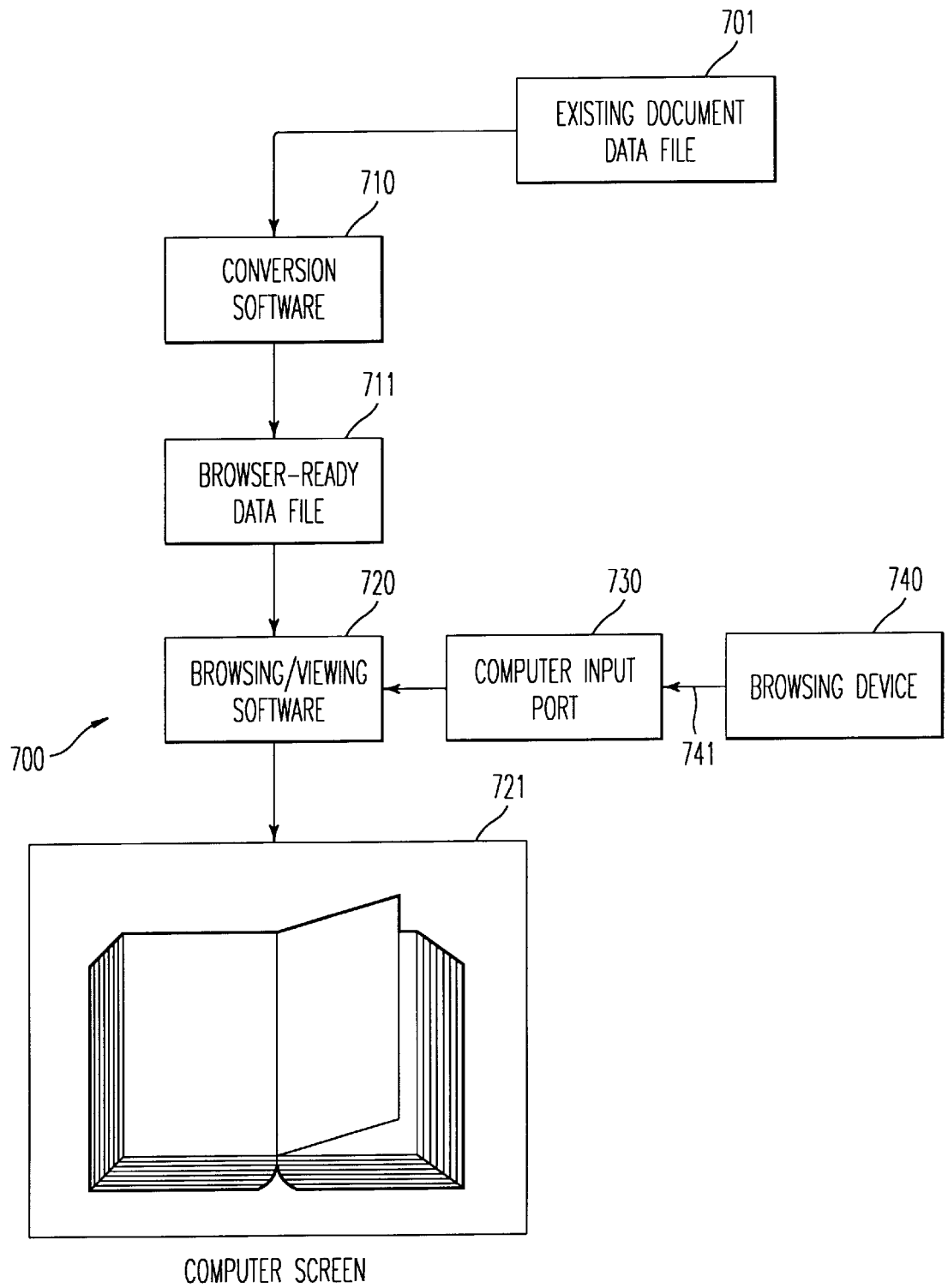
FIG. 7 is a schematic block diagram of the browsing system that incorporates the inventive browsing device of FIG. 1B.

FIG. 7 depicts an embodiment of a complete browsing system 700. In this system 700, a conversion software 710 (a computer program preferably coded in a "C programming language")is provided to pre-convert the document 701 to be viewed that is stored in the computer in whatever existing form (e.g., such as in the form of a text file, stored on the hard disk in the Windows 95 operating environment) to a form 711 that allows one of the five methods (500, 510, 520, 530 and 540) of moving through the document as described above or other methods to be implemented and to be used in conjunction with the browsing device 740 (in one of the configurations 200, 210, 220, 230, 240, and 250 described above or other configurations). The document 701 in its existing form on the computer can also be converted on the fly which may require specialized hardware to achieve the required speed of operation. During operation, a browsing/viewing software 720 is also needed to convert the signals from the browsing device to effect all the operations on the document as described above. The browsing/viewing software 720 (a computer program preferably coded in a "C programming language") takes as its data input either the pre-converted data file 711 or the document in its existing form 701 (to be converted on the fly during the browsing process). The browsing device 740 sends the necessary signals through a bus 741 (preferably a 25 pin parallel port ribbon cable, although a serial bus or mouse line are example alternatives which require appropriate cooperating multiplexing circuitry) and to a computer input port 730 (preferably a 25 pin parallel port, or alteratively a mouse port or a RS-232 port) to the browsing/viewing software 720 to effect the necessary operations on the screen 721 of the computer.

FIG. 8 depicts one embodiment of the browsing device's 100 electrical block diagram 800. The sensor area 121 on the browsing device 100 (FIG. 1B) is made up of a force and position sensor that is used to sense the force and position of the thumb 122 (or one of the other fingers) on that area, and signals representing these two parameters are made available through a Force and Position Signals Generator Circuit 801 (preferably the separated Force and Position Analog LP Interface circuit described in the Interlink Electronics, Inc. document "FSR® Integration Guide and Evaluation Part Catalog with Suggested Electrical Interfaces"). Respective Force and Position signals are presented to the computer through one of the input ports 730 (FIG. 7), to the software 720 responsible to effect the necessary operations on the screen of the computer. The signals from the buttons 111–114 and 131–134 (of which are preferably on/off pushbutton toggle switches) on the top surface 110 and bottom surface 130 respectively of the browsing device 100 (FIG. 1B) are also transmitted to the computer via the bus 741. A common voltage line is available to send a corresponding common voltage through individual ones of the buttons 111–114 and 131–134 when the respective buttons are closed.

FIG. 9 depicts another embodiment 900 of the browsing device 100 of FIG. 1B. This device 900 includes many thin, hard and flexible pieces of material 901 bound together in the manner of the binding of the pages in a book, except that the "flipping" side is made into a slanted surface 920 in much the same way as in the device 100 depicted in FIG. 1B. When the thumb 122 applies a force onto the slanted surface 920, the "pages" 901 will bend like the pages in a normal book and the bending force is sensed to effect the same operations as those performed by the thumb's force on the slanted surface 121 of the browsing device 100. To jump to a certain page, the thumb 122 slides along the slanted surface 920 in the x-direction (similar to that defined for the browsing device 100) until it reaches the desired position, say XT, and then it bends the remaining pages 901, much like one would bend the pages of a book in the process of holding onto the left and right edges of the book to browse through the pages, which results in a slight separation 960 of the pages 901 for which x>XT from those pages for which x<XT and a gap 960 in the pages 901 is created where the thumb 122 is placed. Thin film sensors 970 are placed on the surfaces of these mini-pages 901 to sense the separation 960 and hence the location to jump to in the document involved. The mapping of the position of the thumb 122 to the page jumped to in the document is identical to that used in the device 100 depicted in FIG. 1B as described above in the flowchart in FIG. 4. Four buttons 911–914 are provided on the top surface 910 and four buttons 931–934 are provided on the bottom surface 930 of the device 900 that function like the four buttons 111–114 on the top surface 110 and the four buttons 131–134 on the bottom surface 130 respectively of the browsing device 100. Mechanisms 951 and 952 are also provided to join two devices 900 (a left-hand and a right-hand version) together. All other operations are identical to those described for the device 100 depicted in FIG. 1B.

Figure 10A:
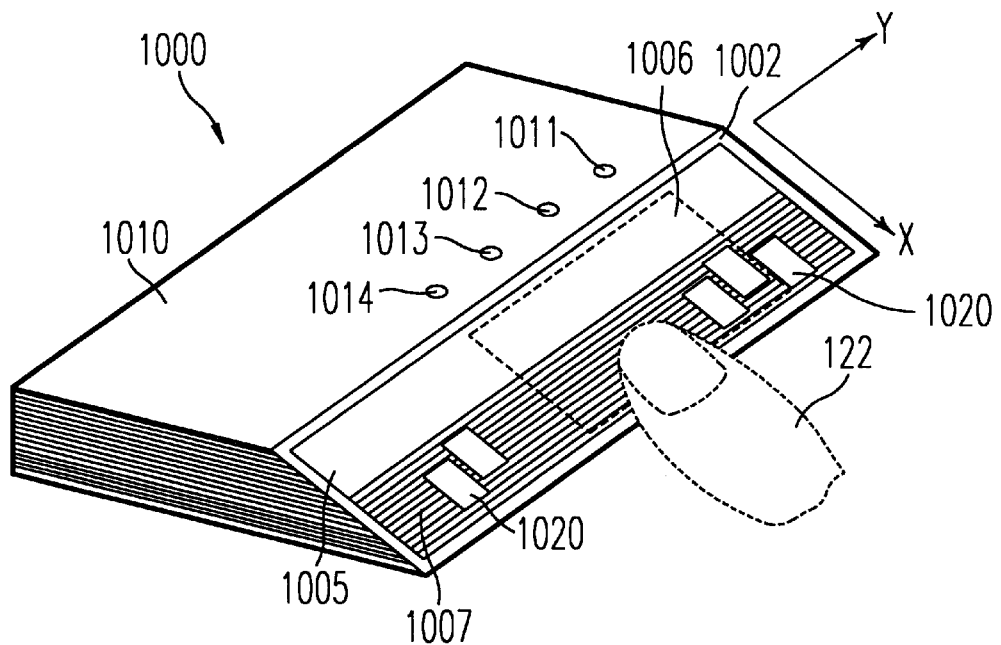
FIG. 10 is a top/bottom schematic perspective view of another embodiment of the browsing device that uses a display screen fitted to a slanted surface to display a material thicknesses before or after currently viewed material.
Figure 10B:
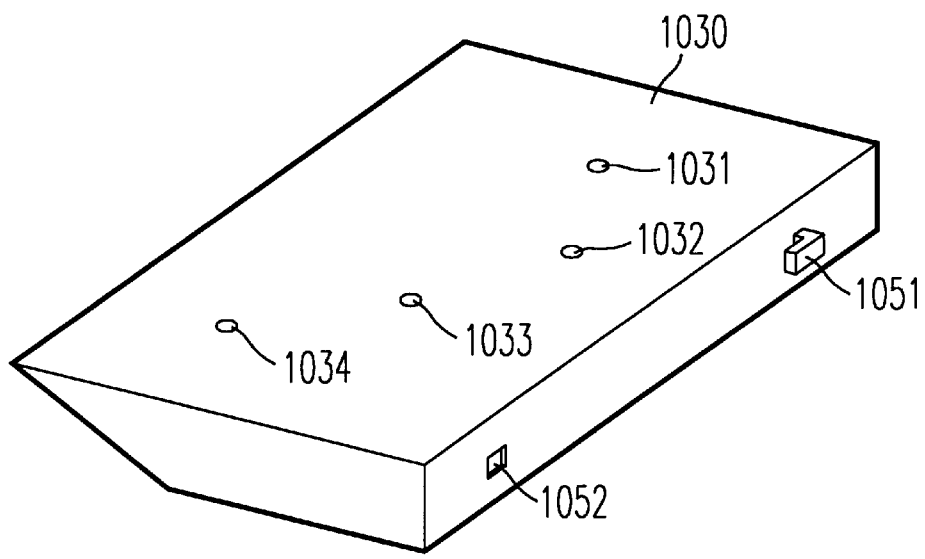

FIG. 10 depicts yet another embodiment 1000 of the browsing device 100 of FIG. 1B. In this embodiment 1000, an LCD, plasma or other type of display screen 1005, much like what is normally used as a computer monitor, is fitted onto the slanted surface 1002 of the browsing device 1000 as shown in the FIG. 10. It is used to display the amount of material present before and after the currently viewed material. To do this, a thickness 1007 is displayed on the screen 1005 that is proportional to the amount involved, that changes with the changes of the amount involved. On this thickness 1007, bookmarks 1020 can be displayed that indicate the locations of the pages/parts of the document involved. The same methods as described before for the computer book 300 depicted in FIG. 3 are used here on the screen 1005 for the following: (a) display the change of thickness; (b) display the bookmarks, and (c) display, the thickness 1007, of the location of the page/point in the document that would be jumped to were jumping to be effected at any given moment based on the thumb's x-position on the sensor area 1006 at that moment. Transparent force and position sensors 1006 overlay the screen 1005 and function much like what has been described before for the sensor area 121 in the browsing device 100 except that now the thumb 122 can move to the "absolute" location of the page to be jumped to effect the jumping. In this scheme, even though the thickness 1007 of material as well as the bookmarks 1020 are displayed on the screen 1005 of the browsing device 1000, they can also be displayed on the computer monitor screen like in the case described for the computer book 300 in FIG. 3 at the same time.

The absolute distance method for computing the point/page in the document to jump to when jumping is activated will be described. Let x=0 be the x-position on the screen 1005 that is nearest the edge adjoining the top surface 1010 and the slanted surface 1002. Recall that the intersection of the thumb 122 with the slanted surface 1002 has some spatial extent and the thumb 122 is considered to be at position x1 if it covers the point x1 and some contiguous points x such that x>x1. Consider now that the thickness of the book displayed on the screen 1005 is XS−XH, where XS is the width of the screen 1005. Let PR be the amount of remaining material in the document as defined before. The process of jumping can only be activated when the thumb 122 is at XT>XH, and when that happens, the amount of material skipped, PJ, is equal to PR * (XT−XH)/XS.

In the embodiment of the browsing device 1000, four buttons 1011–1014 are provided on the top surface 1010 and four buttons 1031–1034-are provided on the bottom surface 1030 of the device 1000 that function like the fours buttons 111–114 on the top surface 110 and the four buttons 131–134 on the bottom surface 130 respectively of the browsing device 100. Mechanisms 1051 and 1052 are also provided to join two devices 1000 (a left-hand and a right-hand version) together. All other operations are identical to those described for the device 100 depicted in FIG. 1B.

The above browsing system 700 (FIG. 7) is adapted to be used in conjunction with any software method that allows the reorganization of the material in the document involved to facilitate browsing/viewing. For example, under software control, in conjunction with the use of a mouse cum cursor method, say, two or more pages in the document to be compared or parts of the document to be compared can all be brought together and displayed in the currently viewed page(s). This may be achieved by, say, using the mouse cum cursor to first select parts of the current viewed pages by clicking the mouse button and dragging the mouse like what is normally done or to select one of the currently viewed pages by double clicking on that page where the cursor is now positioned. And then, after moving to another part of the document, the cursor can now be positioned over a point on one of the currently viewed pages and the selected material can be brought into view by one click of the mouse button. The selected material, if it is one page full, will simply cover the page on which the cursor was placed before the one click of the mouse button to bring it into view. If the selected material is not one page full, it will be positioned, say, to the right and bottom of the cursor, and cover part of the page on which the cursor was placed before the one click of the mouse button to bring it into view. Another click of the mouse button will remove this temporarily placed material to allow one to see what was on the page originally. This temporarily placed material will also automatically disappear from the page on which it was placed after that page disappears from view after the user activates movement to other parts of the document.

The above browsing system 700 can also be used in conjunction with any software method that allows the highlighting of selected portions of the material or annotations of the pages in the document involved to facilitate browsing/viewing/reading.

The above browsing system 700 is suitable for use not just for browsing through or viewing documents that do not require any processing of their contents while they are being viewed, but also in conjunction with a word-processing system. Instead of creating a document and processing it on a computer screen like what is normally done, and then scroll up and down to view and browse through it using the usual mouse cum scroll bar method, the method of viewing and browsing through the document as described in the above browsing system 700 can be used. The process of entering/deleting material in the document can also be made to be consonant with the method of movement through the document (i.e., one of the methods 500, 510, 520, 530 and 540 described in FIGS. 5A–5E). If the word processing is used in conjunction with, say, the flipping method 500 of moving through the document, as one finishes entering material for the right-hand page, the page will flip over to reveal a new, empty page for the entering of material. As one deletes material until nothing is left on the currently viewed pages, continued deletion will effect a flipping back to the previous page. Similar mechanisms can be used in conjunction with the other three non-scrolling methods of moving through the document—namely the sliding method 510, the flashing method 520, and the vertical flipping method 540.

The above browsing system 700 is adapted for use in conjunction with any software in which there is information/icons of control "buttons" to be displayed, either for viewing or manipulating, that cannot be fitted within one computer screen. In this case, scrolling in conjunction with the use of a mouse is often done, or sub-menus and sub-operations can be selected by pressing icons of "buttons" on the screen. In the case of selection of sub-menus and sub-operations, the sub-menus or displays containing buttons for sub-operations are flashed on the screen once they are selected. When there is a large amount of this kind of information/operations present in the software, it will benefit from the use of the browsing system—the system can provide a good idea of what kinds of information/operations are available, where they can be found and how they are related to each other, as well as fast access to them. To be used in conjunction with the current browsing system 700, these menus/sub-menus and buttons for operations/sub-operations can all be organized into a "book" and access to them can be effected by the browsing system 700 described above.

Currently, the most popular and convenient form of human-computer interface is the "windows" interface. This interface grows out of the "desktop metaphor" in which manipulating items on a computer screen is likened to manipulating items on a desktop. This kind of interface, though it is a vast improvement over previous kinds of interface and is very friendly to use, still suffers from one of the problems of manipulating items on a desktop—a person's desktop tends to get very messy and things are hard to find when there are too many of them present. In the windows interface, when there are a lot of sub-directories/files within a directory that cannot be fitted within one window or one screen, they are to be located by scrolling through the use of a mouse, with all the attendant problems as described above for the browsing of information using this method. Also, when many windows are opened, they tend to obscure each other and those that are currently not in view are hard to find because their locations (in the "third dimension"—the "direction perpendicular to the screen") are not fixed, much like a scattered collection of papers on a desktop.

Figure 11A:
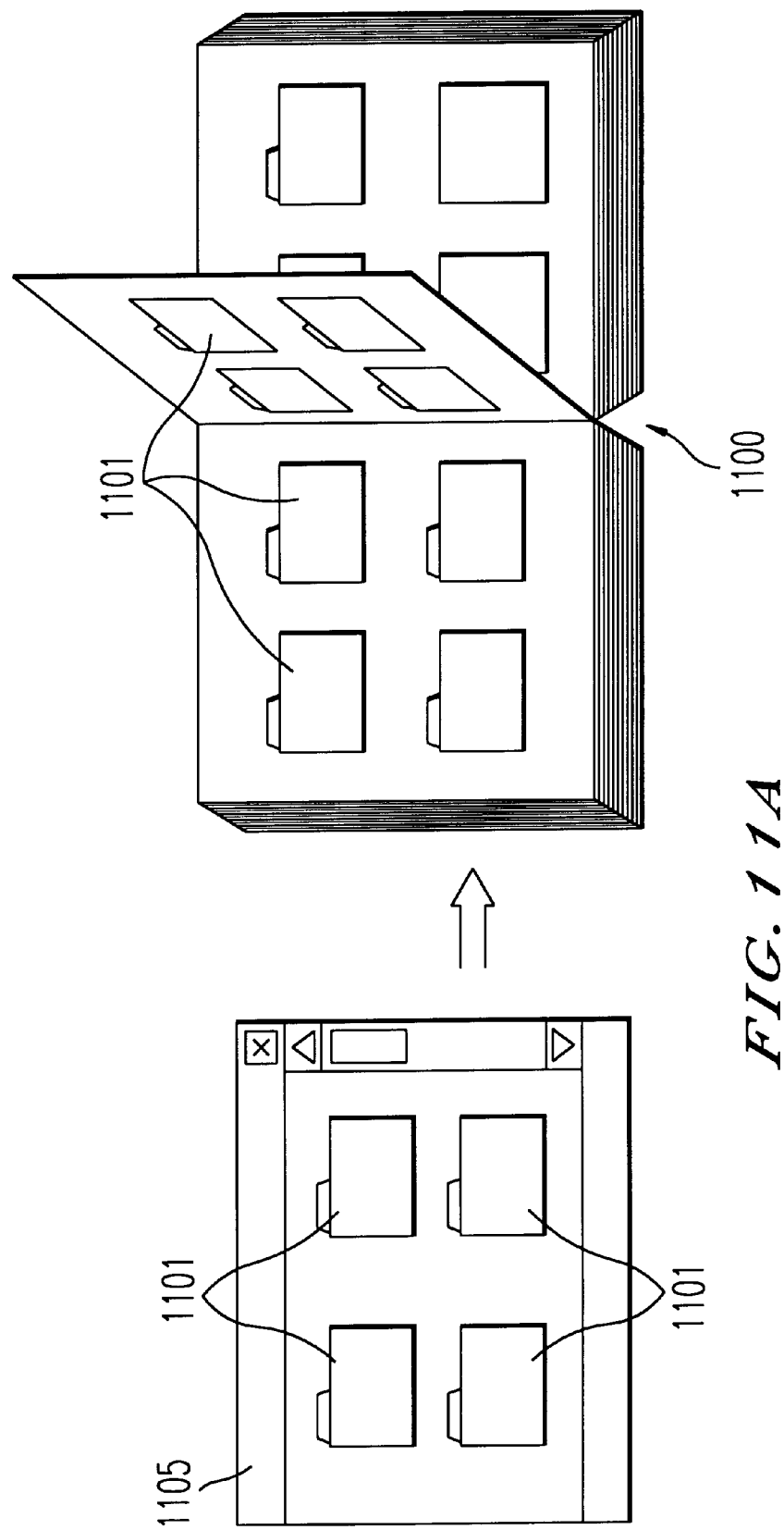
FIG. 11A is a comparative schematic diagram of directories/sub-directories in a "window" compared with pages of a computer book that uses the flipping method of FIG. 5A in order to move through the book.
Figure 11C:
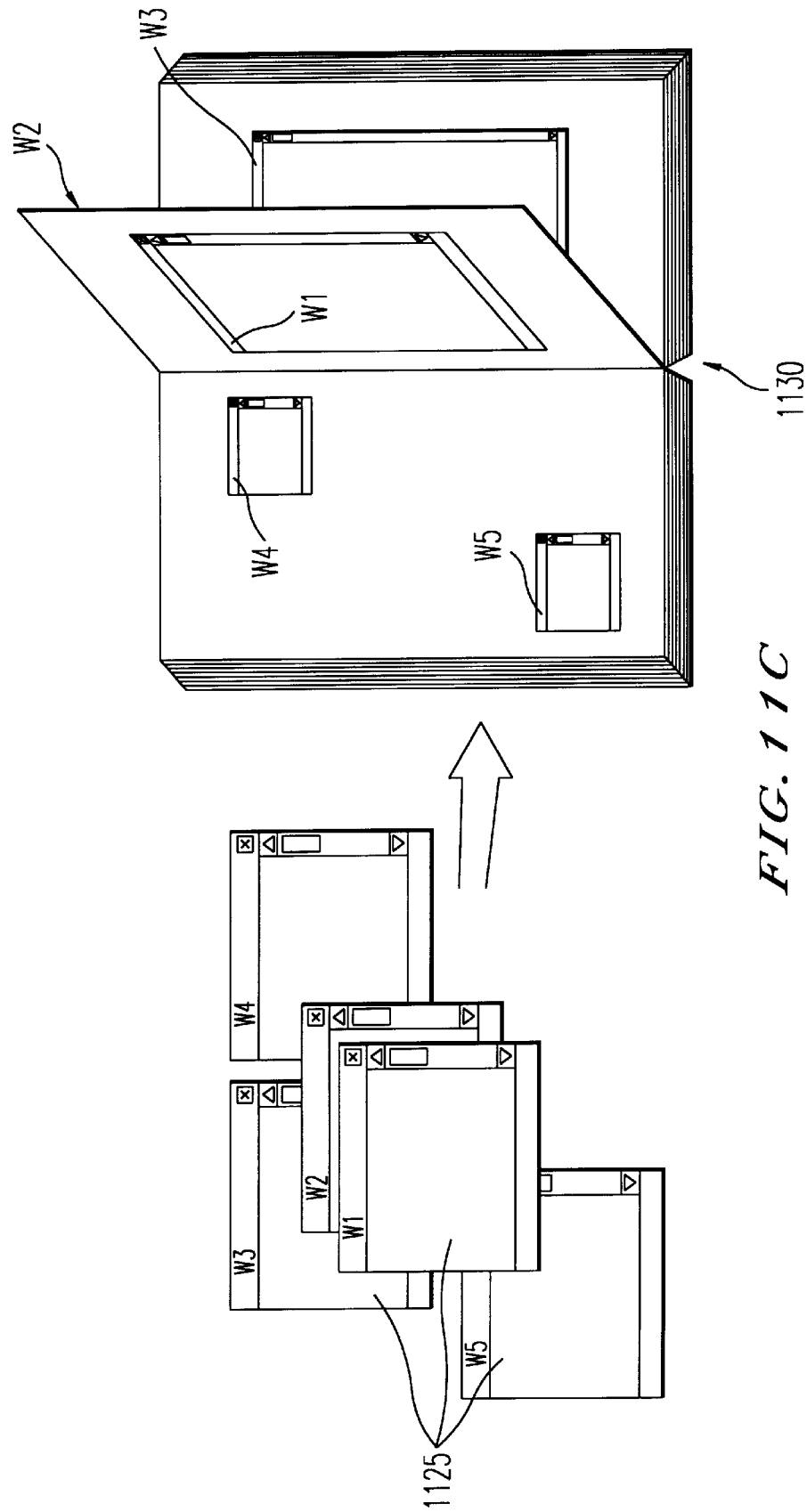
FIG. 11C is a comparative schematic diagram of working windows in a "windows" system compared with pages of a computer book that uses the flipping method of FIG. 5A to move through the book.

The human-computer interface can be improved by organizing these directories/sub-directories or temporary working windows into "books" to be manipulated by the browsing system 700 described above. All information on the computer can be organized into one big book or more than one book at any given moment, hence the "library metaphor". There are at least three possible improvements: (a) sub-directory and file icons that cannot be fitted onto one window/screen can be browsed through and better accessed if they are organized/implemented in a form to be used in conjunction with the browsing device/system 700 described above FIG. 11A depicts one embodiment of this in conjunction with the flipping method 500 of moving through the document: items 1101—directories/sub-directories or files—in a window 1105 are placed in the pages of the book 1100 which is an instance of the computer book 500 depicted in FIG. 5A; (b) sub-directories 1115 (FIG. 11B) and files 1116 that are normally found in windows 1114 in the current window-based systems can be organized into chapters, sections, etc. in a computer book 1120 (an instance of the computer book 500 depicted in FIG. 5A) instead and used in conjunction with the browsing system 700, an embodiment of which is depicted in FIG. 11B; and (c) items that are being worked on, either collections of files and sub-directories or the current working areas in a software application (such as a word-processor) which current systems present in "windows", can be organized into pages in a "scrap book" to be used in conjunction with the browsing system 700 with its attendant advantages. FIG. 11C depicts one embodiment of this in conjunction with the flipping method 500 of moving through the document. Either each window 1125 maps onto one page or many windows 1125 can map onto one page in a computer book 1130 (an instance of the computer book 500 depicted in FIG. 5A).

Figure 12:
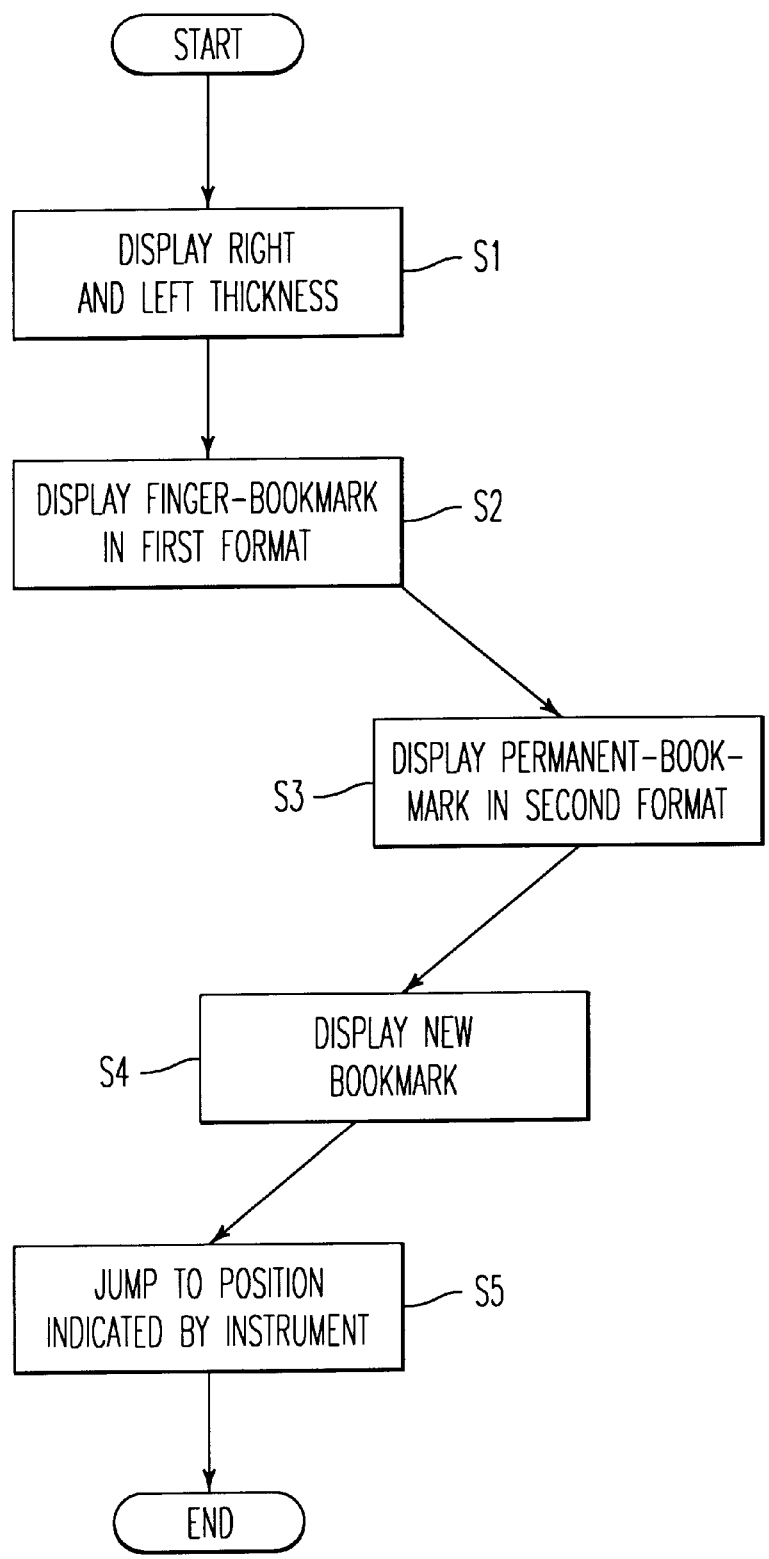
FIG. 12 is a flowchart of a method for displaying a set of information on a display screen as controlled by a browsing device.

FIG. 12 describes a method for displaying a computer-based set of information on a display screen controlled by the inventive browsing device. Step 1 displays a thickness image of a set of information corresponding to the size of a data file which holds the set of information. The thickness image includes a left side portion and a right side portion which are displayed on the display screen. The left side portion of the thickness image is displayed on the left side of the screen and is proportional to an amount of the information that proceeds a given point in the set of information that is currently being displayed on the display screen. The right-hand portion of the thickness image is displayed on the right-hand side of the display and is proportional to an amount of the information that comes after the point as currently displayed on the display screen. For example, if the currently displayed point is near the end of the document, the left-hand side of the display will have a thickness image that appears thicker than that on the right-hand side.

After step 1, the process flows to step S2 where all existing finger-bookmarks are displayed in a first image format. Then, in step S3, all existing permanent-bookmarks, are displayed in a second format. Both the finger-bookmarks and the permanent-bookmarks are displayed in the location in the thickness display corresponding to the locations of the material they bookmark. Then the process flows to step S4 where the user elects to bookmark the currently viewed material and a new bookmark (finger-bookmark or permanent bookmark) is added to the display. After S4, the process flows to step S5 where a position within the set of information is jumped to in response to a jump position indicated by the instrument (e.g., the user's finger). Once the position is jumped to, the process ends.

Figure 13:
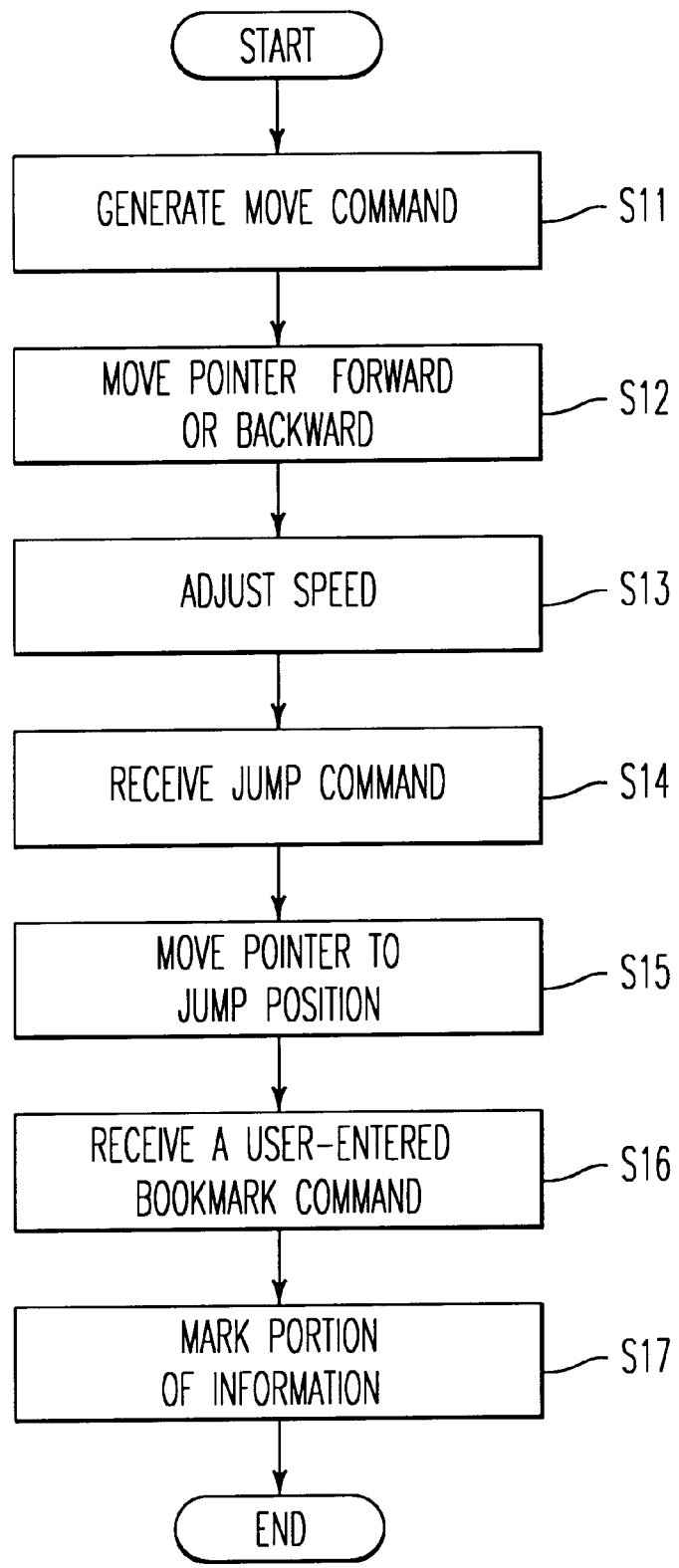
FIG. 13 is a flowchart of a method for browsing a set of information on a display screen.

FIG. 13 describes a method for browsing a computer-based set of information. The process starts in step S11 where a move command is generated to move a pointer through a set of information hosted on the computer either in a forward direction or a backward direction. The process then flows to step S12 where the pointer is moved in response to the command that was generated in step S11. The process then flows to step S13 where the speed of movement of the pointer through the information is adjusted. The process then flows to step S14 where a jump command is received. The process then flows to step S15 where a pointer is moved to a jump position in response to the received jump command. The process then moves to step S16 where a bookmark command is received to mark a desired portion of text or graphics information from the set of information. A user enters the bookmark command based on the desired portion of textual graphics. The process then moves to step S17 where the desired portion is marked in the set of information corresponding to the received bookmark command, after which the process ends.

Figure 14:
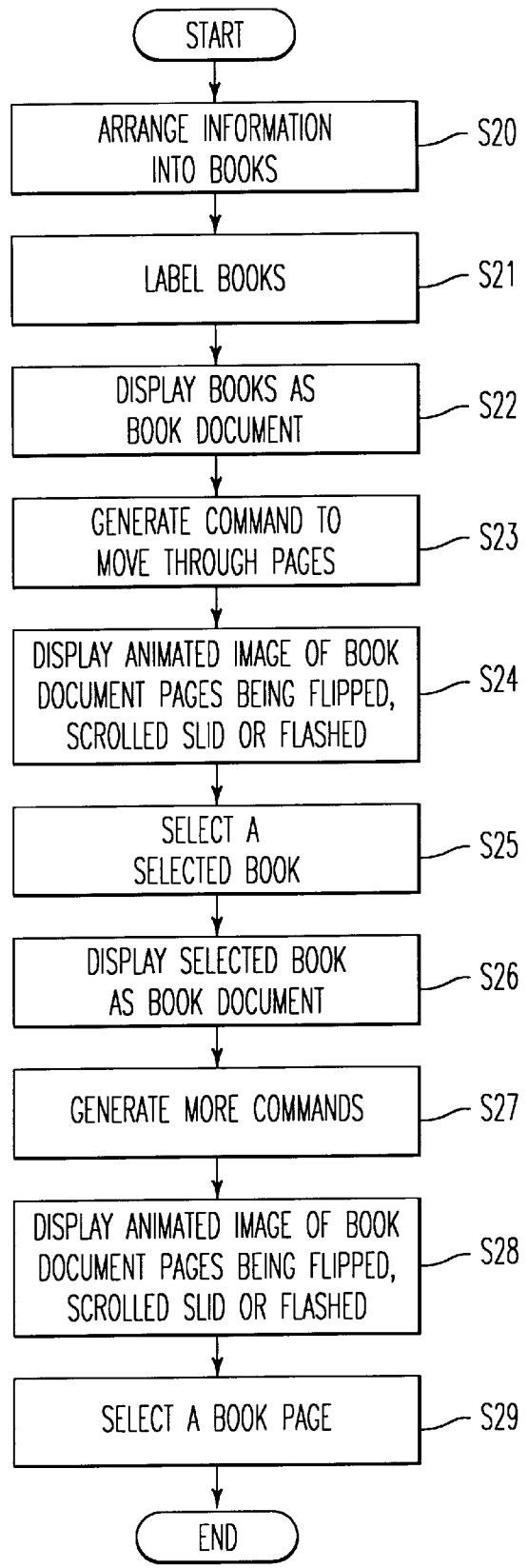
FIG. 14 is a flowchart of a user-interface method according to the library metaphor aspect of the present invention.

FIG. 14 is flowchart for a computer-interface process. The process starts in step S20 where a set of information hosted on the computer is arranged in a set of books. Each of the books includes a subset of the information from the set of information hosted on the computer. Once arranged, the process flows to step S21 where each of the books is labelled with a respective portion of the subset of information corresponding with each book. The process then flows to step S22 where, based on user input, a user can select a selected book by first viewing books which are displayed as a single book document image. The book document image is made up of individual pages that correspond to the respective portions of the books. The process then flows to step S23 where a command is generated, as actuated by the user, to move through the pages so that a user can view the individual pages and select a desired book. The process then flows to step S24 where the pages of the book are displayed in an animated image where the pages of the book document are either flipped (preferable), scrolled, slid or flashed on the screen. The process then flows to step S25 where, while viewing the animated image, the user via user input can select one of the pages. By selecting one of the pages, the user has selected the desired book. The process then flows to step S26 where the selected book is displayed as the image of a book document. However, pages of the selected book document include respective portions of the subset of information corresponding to the selected book. The process then flows to step S27 where a move command is generated for moving a pointer through a subset of the pages of the selected book. The process then flows to step S28 where an animated image is displayed of the pages in the selected book being shown as either flipped (preferable), scrolled, slid or flashed on the screen. The process then flows to step S29 where a selected book page of the selected book is selected by the user via a user input indication. Once the user has selected the desired book page, the process ends.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

Obviously numerous modifications and variations of the present invention are possible in light of the above teachings. It is therefore to be understood that within the scope of the appended claims, the invention may be practiced otherwise than specifically described herein.

What is claimed as new and is desired to be secured by Letters Patent of the United State is:

1. An operating system interface method, comprising the steps of:

arranging a set of operating system related entities hosted on a computer into a book, the book having a subset of said operating system related entities presented on at least one page of said book and/or another book, said arranging step includes arranging said operating system related entities as at least one of
respective labeled computer files,
a collection of hierarchically arranged computer files, and
a software application user interface of a software application;

labeling each book with a respective portion of said subset of said operating system related entities; and selecting a book from a set of books, said selecting step comprising,
  displaying said respective portions of said books as a book document image comprising pages, said pages corresponding to said respective portions of said books,
  generating a command for moving through said pages,
  displaying an animated image of said pages of said book document being at least one of flipped, scrolled, slid and flashed, and
  selecting said book when a selected one of said pages containing a selection portion of said book is displayed in said displaying step.

2. The interface method of claim 1, further comprising the steps of:
  identifying a selected book page of a set of book pages within said selected book, comprising the steps of,
  displaying the selected book as the image of the book document,
  generating a move command for moving a pointer through a subset of pages of said selected book,
  displaying an animated image of said pages in said book document being at least one of flipped, scrolled, slid and flashed, and
  selecting said selected book page in said selected book when the selected book page is displayed in said step of displaying an animated image of pages in said book.

3. The interface method of claim 1, wherein said computer file label being at least one of a text name and an icon.

4. The interface method of claim 1, wherein said collection of computer files being presented in a folder, said folder including specific files of said collection of computer files.

5. The interface method of claim 1, wherein said software application user interface includes a window containing a user interface for the software application.

6. The interface method of claim 1, wherein said step of displaying said respective portions of said books comprises displaying said book after a number of said pages has been changed in a changing step by at least one of, adding one or more pages, and deleting one or more pages.

7. The interface method of claim 1, wherein said step of displaying said respective portions of said books comprises,
  displaying thickness representation on respective sides of said book,
  displaying a bookmark on a selected page of said book,
  jumping to said selected page of said book when said bookmark is selected by a user.

8. The interface method of claim 1, further comprising the step of:
  adding more pages to said book in response to receiving a command to display an additional operating system related entity.

9. The interface method of claim 1, further comprising means for adding and deleting pages.

10. A method for displaying a computer-based set of information on a display screen controlled by a computer-based information browsing device, comprising the steps of:
  displaying said set of information as a book image, respective portions of said set of information being displayed as an open page of said book image that overlaps another page that was previously moved from a right side of said book to the left side of said book, and open pages of said book remain at a fixed location with respect to said display screen as different pages of said book image are displayed;
  displaying a thickness image of said book image corresponding to an amount of said information on a left side and a right side of said display screen, a left portion of said thickness image displayed on said left side of said screen being proportional to a first amount of the information preceding a point in said set of information currently being displayed and a right portion of said thickness image displayed on said right side of said display screen being proportional to a second amount of information following the point in said set of information currently being displayed;
  displaying a finger-bookmark in a first image format on said display screen corresponding to a finger-bookmark position;
  displaying a permanent bookmark in a second image format on said display screen corresponding to a permanent bookmark position;
  producing a new bookmark corresponding to a currently displayed image;
  displaying said new bookmark in at least one of said first image format or said second image format; and
  jumping to a jump position in said set of information corresponding to a current position of an instrument on a sensor device of said computer-based information browsing device.

11. The method of claim 10, wherein:
  said step of displaying a thickness image includes,
    displaying a left-side thickness of said book image while keeping a right vertical edge thereof remaining stationary with respect to the display screen,
    displaying a right-side thickness of said book image while keeping a left vertical edge thereof remaining stationary with respect to the display screen; and
  further comprising steps of
  changing the left-side thickness in response to moving through the set of information and generating a command to cause a left vertical edge of the displayed page to change position, and
  changing the right-side thickness in response to moving through the set of information and generating another command to cause a right vertical edge of the displayed page to change position.

12. The method of claim 10, wherein:
  said finger-bookmark disappears when a bookmarked page is revisited; and
  said permanent bookmark does not disappear when a permanently bookmarked page is revisited.

13. The method of claim 10, further comprising the steps of:
  displaying on the thickness image a jump cursor,
    said jump cursor being user-activated and identifying a location in the set of information in which to effect a jump operation, and
    said jump cursor showing a location in the set of information to which the jump operation will be made.

14. The method of claim 10, further comprising the steps of:
  displaying more than two flipping pages simultaneously, said flipping pages showing information from corresponding parts of said set of information.

15. The method of claim 10, further comprising the step of:
  displaying increasingly more flipping pages simultaneously as a document browsing speed is increased.

16. The method of claim 10, further comprising the step of:
  freezing a number of flipping pages in an act of flipping across the computer screen in response to receiving a freeze command issued by a user.

17. An operating system method for browsing a computer-based set of operating system related entities, comprising the steps of:
  generating a command to move a pointer through said set of operating system related entities, said operating system entities including at least one of
    respective labeled computer files,
    a collection of hierarchically arranged computer files, and
    a software application user interface of a software application;
  displaying said set of operating system related entities in respective book images and organized in groups, a portion of said system related entities being displayed as being graphically contained within a book image for one of the operating system related entities;
  moving said pointer in at least one of a forward direction and a backward direction through said computer-based set of operating system related entities in response to said command generated in said generating step;
  adjusting a speed of said movement of said pointer through said computer-based set of operating system related entities corresponding to said command generated in said generating step;
  jumping to a selected location in said computer-based set of operating system related entities, said jumping step comprising the steps of,
    receiving a jump command, and
    moving said pointer from a current position in said computer-based set of operating system related entities to a user-defined jump position; and
  bookmarking a desired portion of said computer-based set of operating system related entities, said desired portion comprising a selected subset of a text or a graphics information, said bookmarking step comprising the steps of,
    receiving a bookmark command via a user-entry, and
    marking said desired portion of said computer-based set of operating system related entities corresponding to said user entry.

18. The method of claim 17, further comprising the steps of:
  displaying said book image with a thickness image indicative of an amount of information content behind a displayed page of book image;
  displaying on the thickness image a jump cursor,
    said jump cursor being user-activated and identifying another page of the book image in which to effect a jump operation, and
    said jump cursor showing the another page to which the jump operation will be made.

19. The method of claim 17, further comprising the steps of:
  displaying more than one flipping pages of said book image simultaneously, said flipping pages showing information from corresponding parts of said book image.

20. The method of claim 17, further comprising the step of:
  displaying more flipping pages of said book image simultaneously as a document browsing speed is increased.

21. The method of claim 17, further comprising the step of:
  freezing a number of flipping pages of said book image in an act of flipping across the computer screen in response to receiving a freeze command issued by a user.

22. An operating system user interface apparatus, comprising:
  a display;
  a computer connected to said display, comprising,
    means for arranging a set of operating system related entities hosted on the computer into a book, the book having a subset of said set of operating system related entities presented on at least one page of said book and/or another book, said operating system entities including at least one of
      respective labeled computer files,
      a collection of hierarchically arranged computer files, and
      a software application user interface of a software application, wherein
    said means for arranging includes,
      means for labeling each book with a respective portion of said subset of said operating system related entities, and
      means for selecting a book from the set of books, comprising,
        a first display mechanism that displays on said display said respective portions of said books as a book document image comprising pages, said pages corresponding to said respective portions of said books,
        a generating mechanism that generates a command for moving through said pages,
        a second display means for displaying an animated image of said pages of said book document on said display, said animated image being at least one of flipped, scrolled, slid and flashed, and
        a selecting mechanism that selects said book when a selected one of said pages containing a selection portion of said book is displayed by said second display mechanism.

23. The system of claim 22, wherein said computer file label being at least one of a text name and an icon.

24. The system of claim 22, wherein said collection of computer files being presented as a folder, said folder including specific files of said collection of computer files.

25. The system of claim 22, wherein said software application user interface includes a window containing a user interface for the software application.

26. The system of claim 22, further comprising:
  means for displaying a thickness representation on respective sides of said book;
  means for displaying a bookmark on a selected page of said book; and
  means for jumping to said selected page of said book when said bookmark is selected by a user.

27. The system of claim 22, further comprising:
  means for adding more pages to said book in response to receiving a command to display an additional operating system related entity.

* * * * *

UNITED STATES PATENT AND TRADEMARK OFFICE
CERTIFICATE OF CORRECTION

PATENT NO. : 6,064,384

DATED : May 16, 2000

INVENTOR(S): Seng B. HO

It is certified that an error appears in the above-identified patent and that said Letters Patent is hereby corrected as shown below:

On the Title page, Item [73], the Assignee information is incorrect.
Item [73] should read as follows:

--- [73] Assignee: E-Book Systems PTE Ltd.,
Singapore, Republic of Singapore ---

Signed and Sealed this

Tenth Day of April, 2001

Attest:

NICHOLAS P. GODICI

Attesting Officer      Acting Director of the United States Patent and Trademark Office

UNITED STATES PATENT AND TRADEMARK OFFICE
CERTIFICATE OF CORRECTION

| | | |
|---|---|---|
| PATENT NO. | : 6,064,384 | Page 1 of 1 |
| APPLICATION NO. | : 08/703404 | |
| DATED | : May 16, 2000 | |
| INVENTOR(S) | : Seng B. Ho | |

It is certified that error appears in the above-identified patent and that said Letters Patent is hereby corrected as shown below:

On the Title page, item number [73] Assignee: change "E-Brook Systems PTE Ltd, Singapore, Singapore" to --E-Book Systems PTE Ltd., Singapore, Singapore--

Signed and Sealed this
Twenty-second Day of March, 2011

David J. Kappos
*Director of the United States Patent and Trademark Office*